United States Patent [19]

Gudmestad et al.

[11] 4,196,510

[45] Apr. 8, 1980

[54] APPARATUS AND METHOD FOR PRODUCTION OF WIRE LEADS

[75] Inventors: Ragnar Gudmestad, West Allis; Magnus R. Randar, Menomonee Falls; Thomas J. Kratoska, Milwaukee, all of Wis.

[73] Assignees: Artos Engineering Company, New Berlin, Wis.; Artos Engineering Company, New Berlin, Wis.

[21] Appl. No.: 945,562

[22] Filed: Sep. 25, 1978

[51] Int. Cl.$^2$ ............................................. H01R 43/00
[52] U.S. Cl. ..................................... 29/867; 29/33 M; 81/9.51; 29/860
[58] Field of Search ........... 29/33 M, 628, 753, 564.4, 29/564.6; 140/149; 81/9.51

[56] References Cited

U.S. PATENT DOCUMENTS

| | | | |
|---|---|---|---|
| 2,783,525 | 3/1957 | Scharf | 140/149 X |
| 3,918,330 | 11/1975 | Blaha | 81/9.51 |
| 3,999,289 | 12/1976 | Buttner et al. | 29/628 |
| 4,030,174 | 6/1977 | Buttner et al. | 29/33 M |

Primary Examiner—Francis S. Husar
Assistant Examiner—C. J. Arbes
Attorney, Agent, or Firm—James E. Nilles; James E. Nilles

[57] ABSTRACT

Apparatus and method for making a wire lead which comprises a pair of insulated stranded conductors encased in an insulating jacket, with a two-pronged plug at one end and either untwisted or twisted bare or tinned wires with or without terminals at the other end. The apparatus comprises mechanisms to cut and convey a cable segment, strip the insulating jacket from both ends and trim cut the exposed insulated wires, preshape them, strip and twist the stranded wires at the plug end, attach the plug at that end, and strip and perform appropriate processing operations at the other end, i.e., twist, tin, or terminate.

The wire shaping mechanism for preshaping the wires at the plug end of the cable segment also helps position the wires during further processing and includes wire shaping and holding devices movable by an auxiliary conveyor, an inserter for directing the wire ends into releasable engagement with a wire shaping device, an actuator for causing the wire shaping device to effect wire bending, a wire release mechanism, and a reset mechanism for resetting the wire shaping device.

The mechanism for stripping and twisting the end of a stranded wire comprises a gripping device (such as the above-described wire shaping device or a conveyor clamp) which prevents axial and rotational movement of the wire, blades for severing the wire insulation, and a rotatable and axially movable spinner head which releasably grips, rotates, and axially removes the severed piece of insulation, simultaneously twisting the stranded conductors in the process.

20 Claims, 54 Drawing Figures

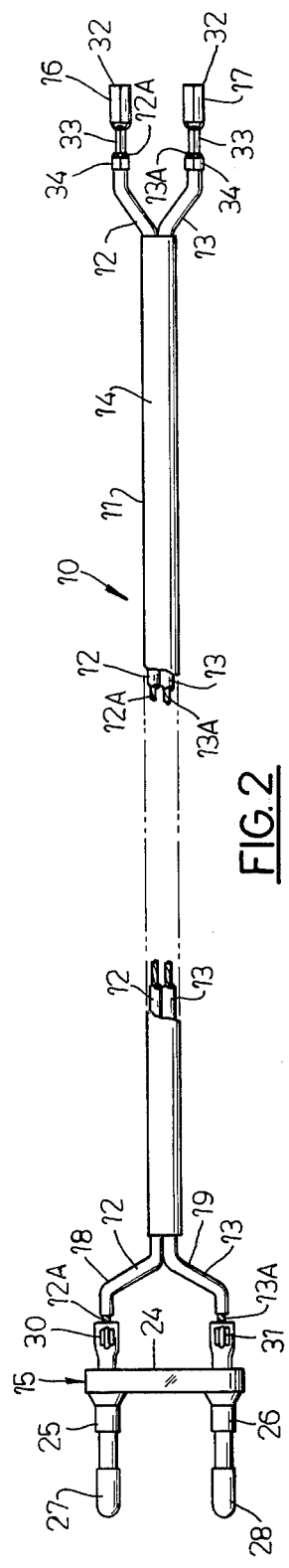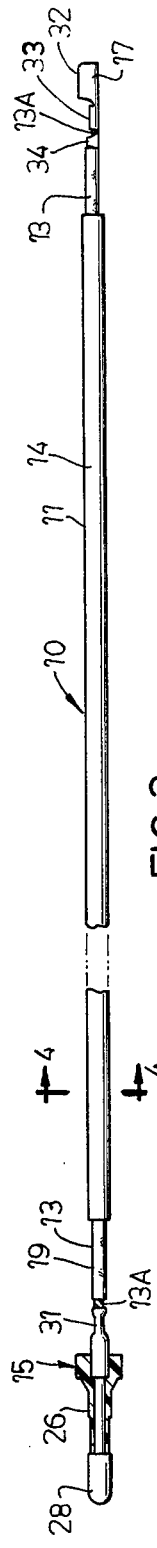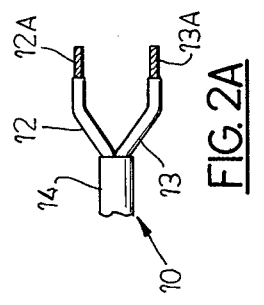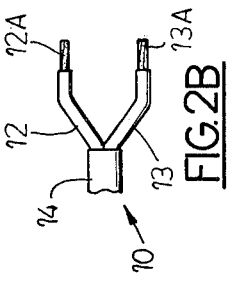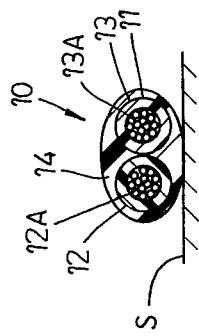

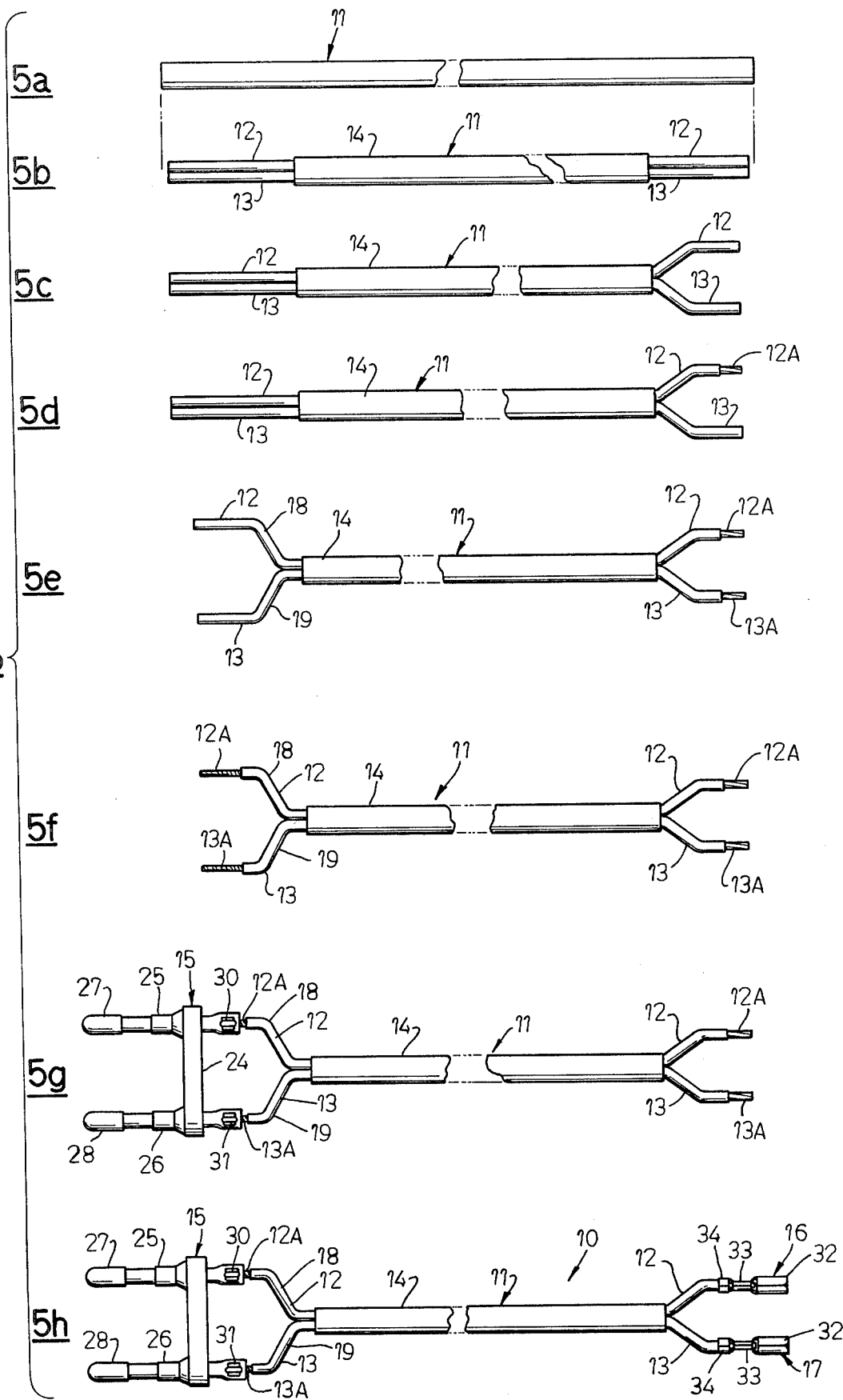

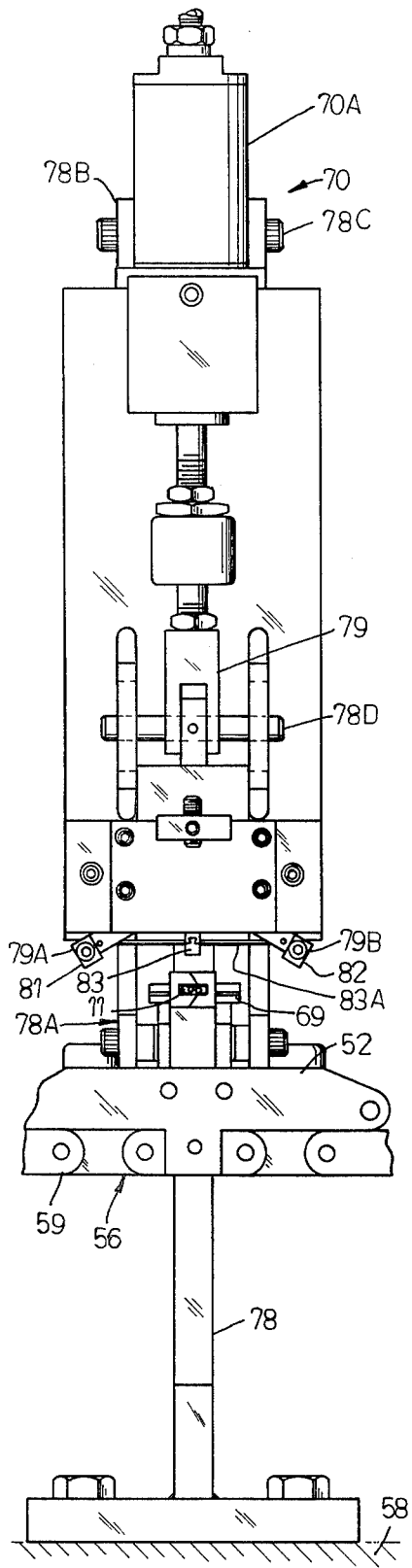
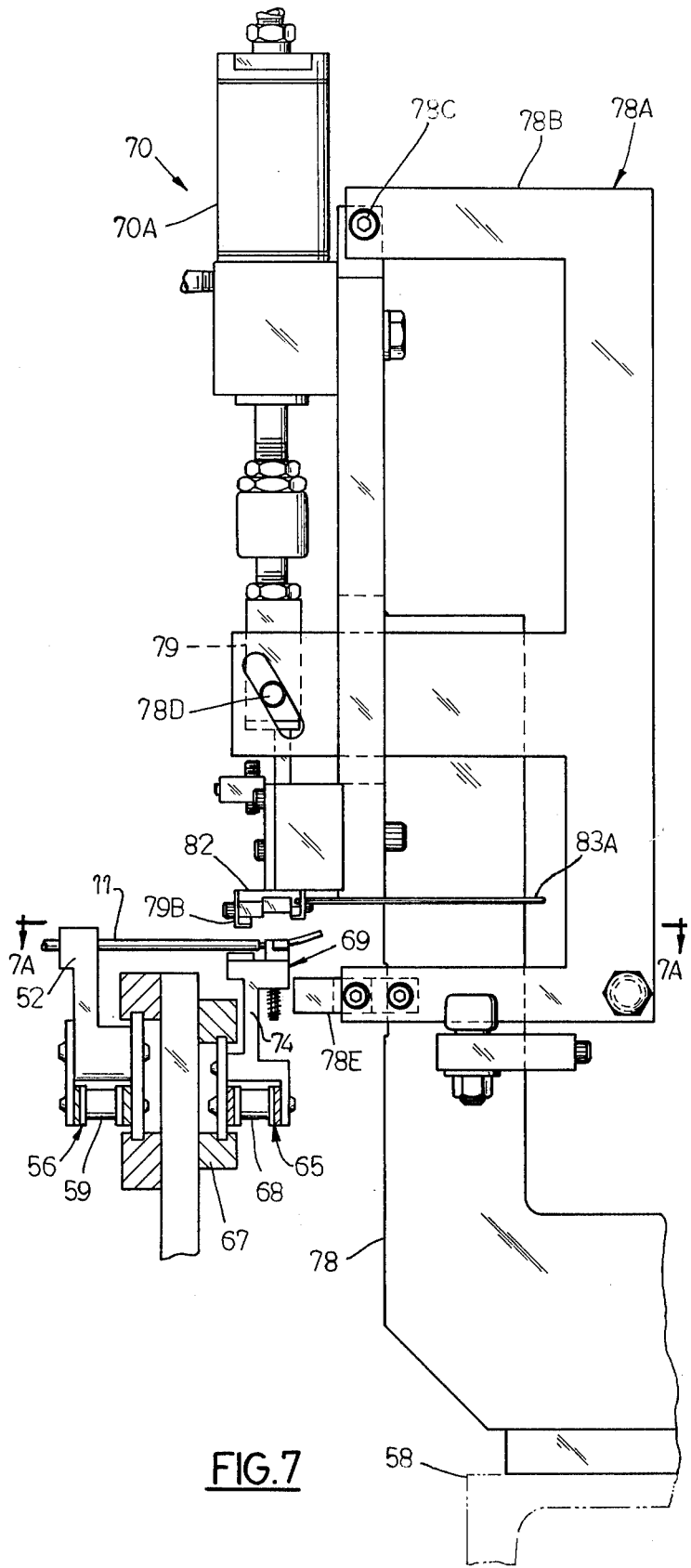
FIG. 6
FIG. 7

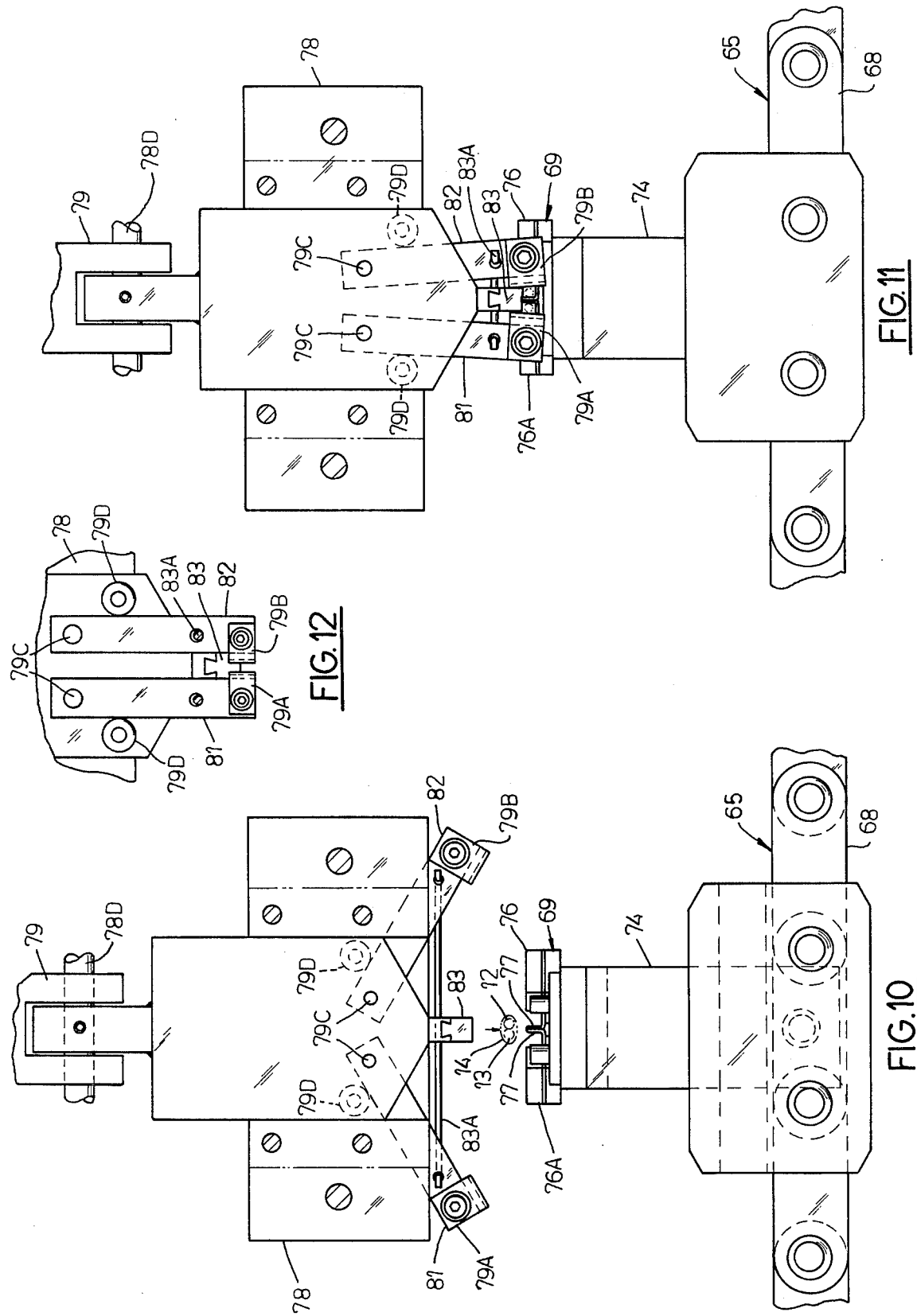

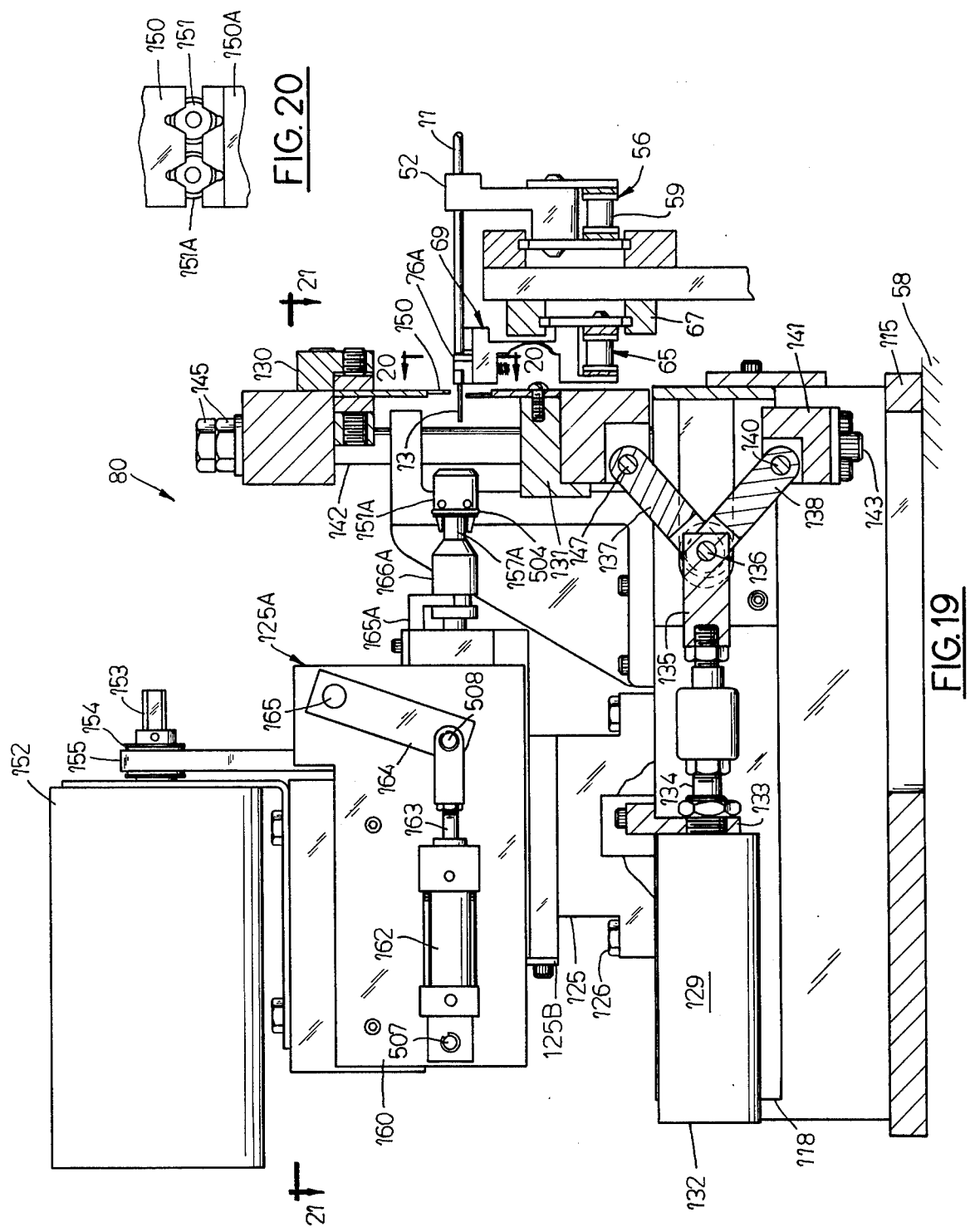

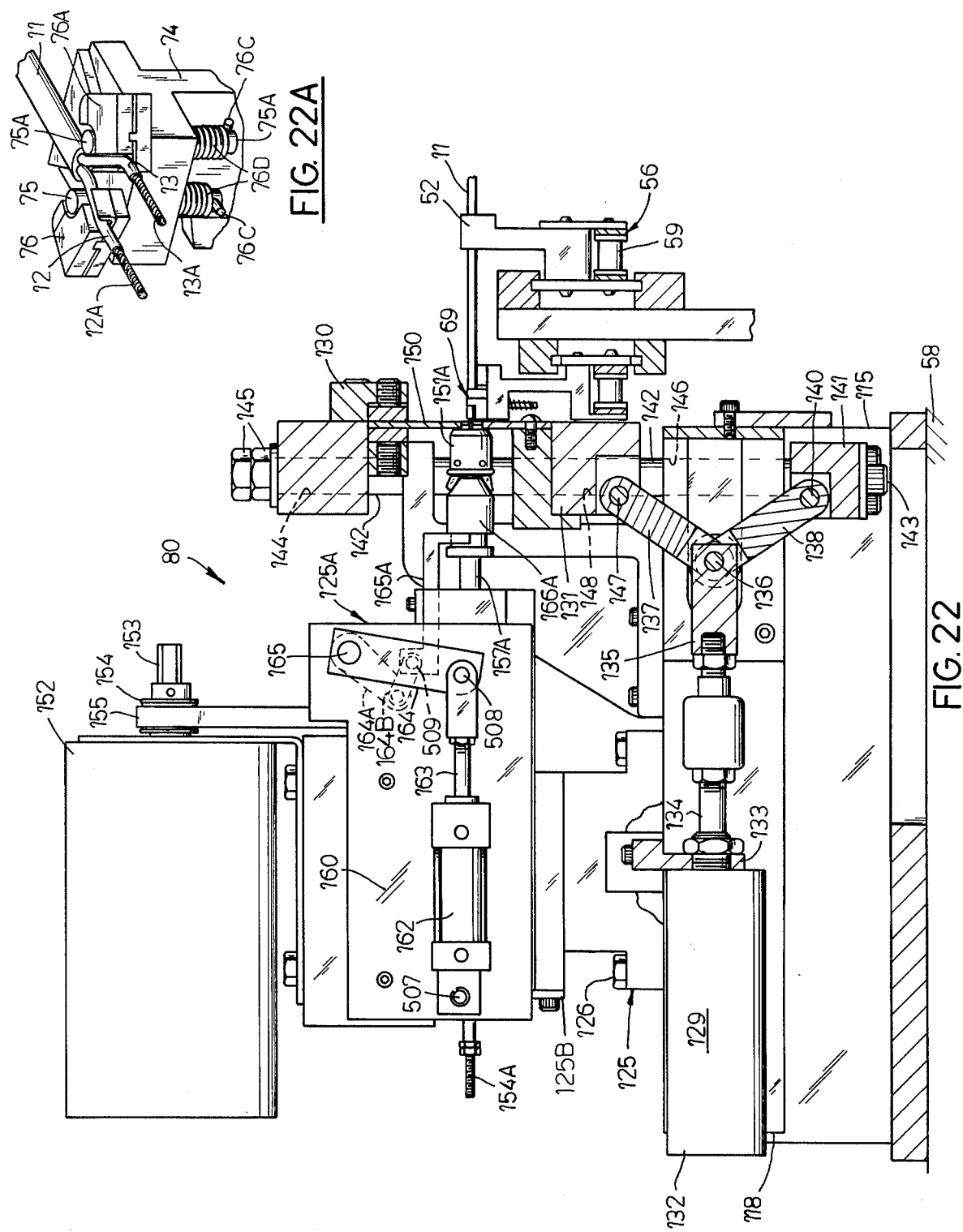

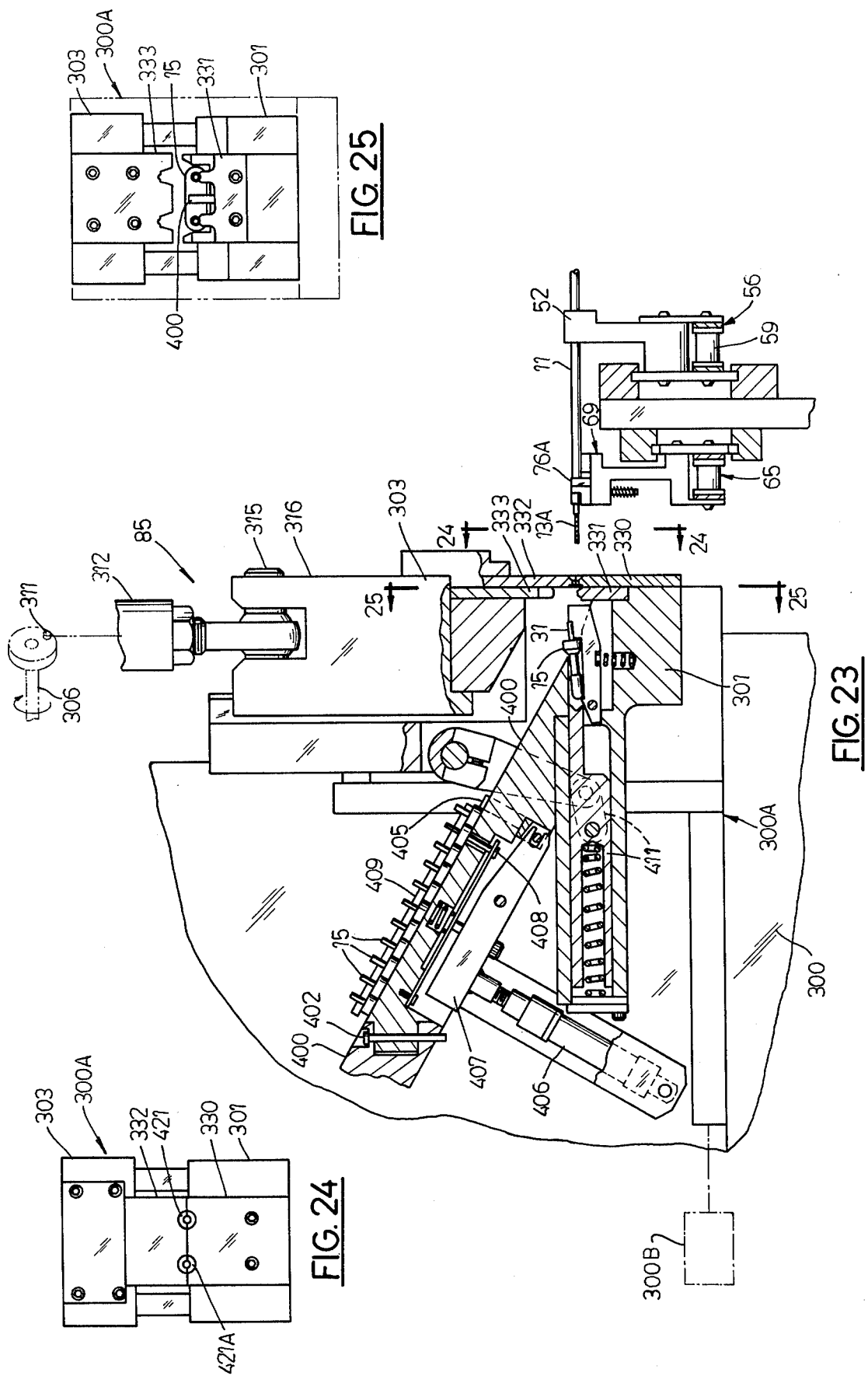

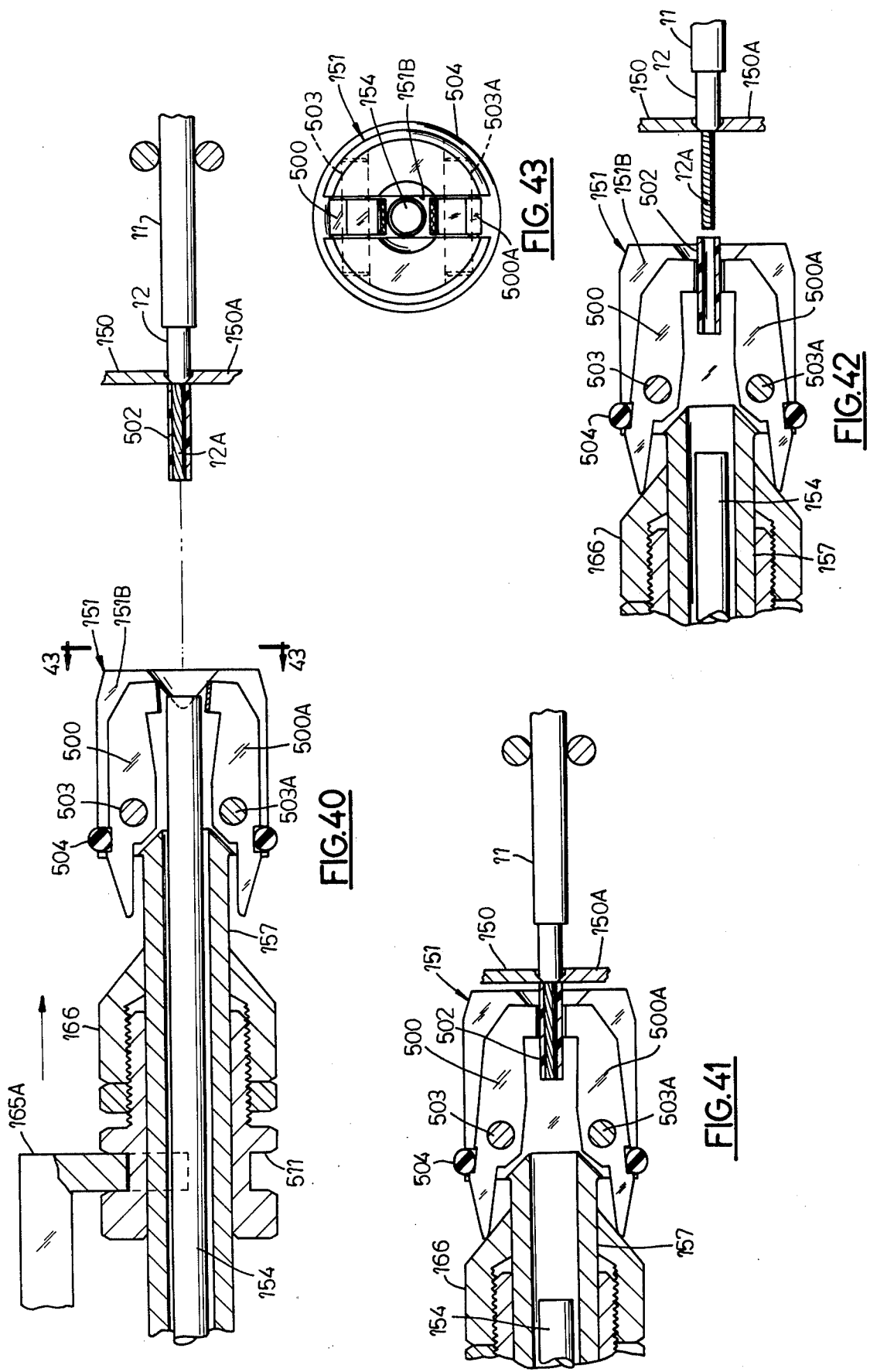

APPARATUS AND METHOD FOR PRODUCTION OF WIRE LEADS

BACKGROUND OF THE INVENTION

1. Field of Use

This invention relates generally to apparatus and method for making double-conductor wire leads having a two-pronged plug at one end and having untwisted or twisted bare or tinned wires with or without terminals at the other end. In particular, the apparatus includes an improved wire shaping mechanism for shaping and positioning the wires at the plug end of the lead prior to plug attachment, and further includes an improved strip and twist mechanism for stripping and twisting the ends of insulated stranded conductors of the wire lead.

2. Description of the Prior Art

Prefabricated wire leads having a plug at one end and bare or terminated wires at the other end are used as power supply cords for electrical appliances and the plug has prongs adapted to fit wall-mounted electrical outlets. European electrical outlets differ from United States outlets and require a plug which typically comprises a pair of spaced apart cylindrical electrically conductive prongs each having a hollow crimpable portion for receiving a bare wire end which is crimped therein.

In U.S. Pat. No. 3,999,289, which discloses prior art apparatus and method for making a wire lead having a European-type plug at one end thereof, cable lengths are prepared to receive a plug at one end by a process wherein cable lengths are moved stepwise through stations, in which each cable length is turned and orientated as to its wire leads therein; in which the lead ends are stripped, tin-plated and shaped in sequential stations, followed by connecting preassembled plugs prongs to the lead ends. The plug body is then extruded around the prong-lead connections. The lead orientation is electro-optically servo-controlled and the prong-to-lead connection is made by a funnel for threading the leads into the hollow prongs followed by squeezing the prongs to fasten the leads thereto.

U.S. Pat. No. 3,999,289 teaches processing one end of a short cable of circular cross section and, therefore, provides means to initially turn the cable so that the two leads therein have the proper orientation for further processing. U.S. Pat. No. 3,999,289 also teaches tinning the bare tips of the wire leads to strengthen them prior to shaping and prior to insertion and crimping them in the prongs of the plug.

SUMMARY OF THE PRESENT INVENTION

Industry requires large quantities of prefabricated low-priced double-conductor wire leads which comprise a wire cable segment, including a pair of insulated stranded flexible wires encased in an insulating jacket having a European-type plug at one end and having untwisted or twisted bare or tinned wires with or without terminals at the other end. The present invention provides improved apparatus and method which are well suited for high speed, high volume economical production of such leads in which all unnecessary production steps and mechanisms are eliminated, in which several production steps are carried out simultaneously, and in which production steps and mechanisms which facilitate accuracy and high speed production are included.

The apparatus comprises the following mechanisms, namely: a feed mechanism for repeatedly providing a cable segment of predetermined length; a main conveyor mechanism for conveying the cable segment along a path; and mechanisms for stripping the insulating jacket from both ends of the cable segment to expose the ends of the insulated wires therein and for trim cutting the exposed ends. The apparatus further includes a mechanism, including a wire shaping device, for shaping the wires at the plug end of the segment and for accurately guiding the shaped ends during subsequent processing steps; a mechanism for simultaneously stripping and twisting the pair of stranded wires at the plug end of the segment while the wires are held by the wire shaping device; a mechanism for attaching a plug to the plug end of the segment while the wires are held by the wire shaping device; and mechanisms for shaping, stripping, and performing appropriate processing operations to the conductors at the terminal end of the segment, such as, twisting, tinning, or attaching connector terminals.

The wire shaping mechanism for preshaping the wires at the plug end of the cable segment also helps position the wires during further processing and includes wire shaping and holding devices movable by an auxiliary conveyor, an inserter for directing the wire ends into releasable engagement with a wire shaping device, an actuator for causing the wire shaping device to effect wire bending, a wire release mechanism, and a reset mechanism for resetting the wire shaping device.

The mechanism for stripping and twisting the end of a stranded wire comprises a gripping device (such as the above-described wire shaping device or a conveyor clamp) which prevents axial and rotational movement of the wire, blades for severing the wire insulation, and a rotatable and axially movable spinner head which releasably grips, rotates, and axially removes the severed piece of insulation, simultaneously twisting the stranded conductors in the process. The strip and twist mechanism for the plug end of the cable segment includes two twist or spinner heads whereby the two wires in the cable segment can be processed simultaneously. However, the strip and twist mechanisms optionally usable at the other end of the cable segment each include only a single twist or spinner head and each wire is processed individually.

The apparatus and method in accordance with the invention offer several advantages over the prior art. Trim-cutting the ends of the wire cable segment ensures greater accuracy and enables trouble-free high-speed operation of subsequent processing steps, especially the plug and terminal attachment steps. Simultaneous insulation stripping and twisting of the end of a stranded wire enables more rapid production. Simultaneous shaping and spacing of the ends of the pair of wires which are to receive the plug, after trim-cutting but prior to other processing steps, enables this pair of wire ends to be processed simultaneously during subsequent stripping and twisting thereby contributing to more efficient and rapid production. Twisting of the stranded conductors at the plug end to facilitate their insertion into the prongs of the plug, instead of fluxing and soldering, saves time and reduces costs and complexity, without sacrificing strength, since the plug structure itself tends to immobilize the wires against damaging movement. Being able to twist, tin, or terminate the stranded conductors at the other end of the segment gives a choice of finishes to suit the needs of particular customers. Other objects and advantages of the invention will hereinafter appear.

BRIEF DESCRIPTION OF THE DRAWINGS

FIG. 2 is an enlarged top plan view of a wire lead manufactured by means of apparatus and method in accordance with the invention and having terminals on untwisted untinned conductors at one end;

FIG. 2A is a view, similar to FIG. 2, of a portion of a wire lead having stripped and twisted conductors at one end;

FIG. 2B is a view similar to FIG. 2 of a portion of a wire lead having stripped, twisted, and tinned conductors at one end;

FIG. 3 is a side elevational view of the lead shown in FIG. 2;

FIG. 4 is an enlarged cross-sectional view of the lead taken on line 4—4 of FIG. 3;

FIG. 5, which includes a series of Figures designated 5a through 5h, depicts the configuration of the lead during various steps or stages in the manufacture thereof;

FIG. 6 is an enlarged front elevational view of a wire inserter mechanism taken on line 6—6 of FIG. 1;

FIG. 7 is a side elevational view of the mechanism shown in FIG. 6;

FIG. 10 is an enlarged front elevational view of the portion of mechanism shown in FIG. 6;

FIG. 11 is a view similar to FIG. 10 but showing the mechanism in a different operating position;

FIG. 12 is a view similar to FIG. 11 and showing components thereof in the same operating position but with parts removed for clarity;

FIG. 19 is an enlarged side elevational view partially in cross section for the sake of clarity taken on line 19—19 of FIG. 1 of a dual wire stripping and twisting mechanism;

FIG. 20 is a view taken on line 20—20 of FIG. 19;

FIG. 22 is a view similar to FIG. 19 but showing the mechanism in another operating position; FIG. 22A is a view similar to FIGS. 9 and 18 but showing the wires in the device after wire has been stripped and twisted;

FIG. 23 is an enlarged cross-sectional view of a plug attachment mechanism and is taken on line 23—23 of FIG. 1;

FIG. 24 is a view taken on line 24—24 of FIG. 23 and shows components in one operating position;

FIG. 25 is a view taken on line 25—25 of FIG. 23 and shows the components in another operating position;

FIG. 40 is an enlarged cross-sectional view of the spinner head shown in FIG. 38 and is taken on line 40—40 of FIG. 38;

FIG. 41 is a view similar to FIG. 40 but showing the head in another operative position;

FIG. 42 is a view similar to FIG. 41 but showing the head in another operative position; and FIG. 43 is an end view taken on line 43—43 of FIG. 40 of the spinner head.

DESCRIPTION OF PREFERRED EMBODIMENTS

The Wire Lead

Figure 1:
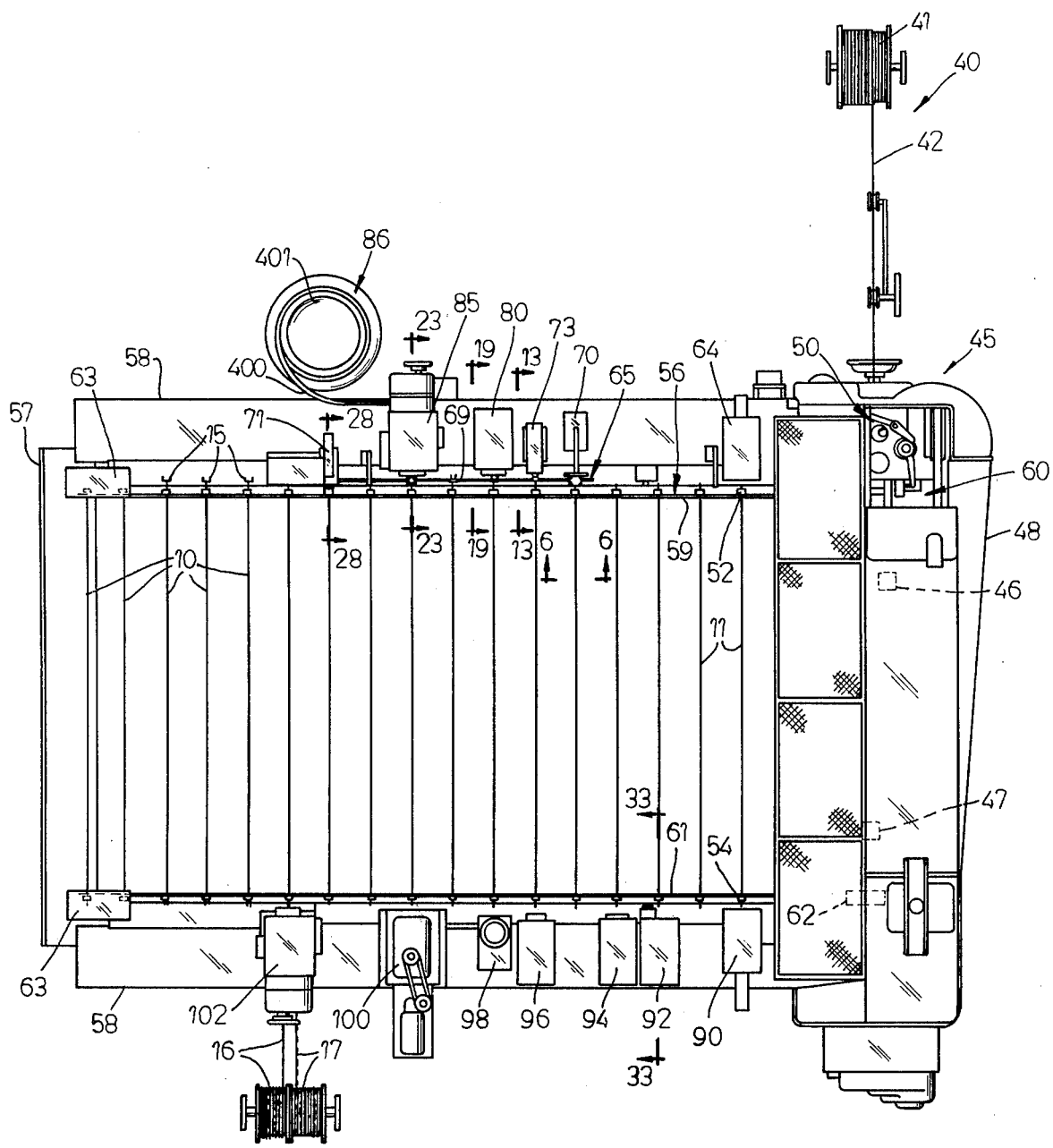
FIG. 1 is a top plan view of the apparatus in accordance with the invention.

FIG. 1 shows a top plan view of apparatus in accordance with the invention for high speed production of wire leads, such as wire lead 10, by a method in accordance with the invention. As FIGS. 2, 3, and 4 show, wire lead 10 comprises a wire cable segment 11 including a pair of insulated stranded flexible wires 12 and 13 which are encased in an insulating jacket 14 with a double-pronged plug 15 at one end and a pair of separate electrical connector terminals 16 and 17 at the other end. FIGS. 2A and 2B show other embodiments of a wire lead 10 wherein, instead of terminals 16 and 17 at the said other end, the stripped stranded conductors are either twisted (FIG. 2A) or twisted and tinned (FIG. 2B). Wires 12 and 13 comprise stranded conductors 12A and 13A, respectively, which are covered by flexible insulation coverings 18 and 19, respectively. As FIG. 4 shows, cable segment 11 has a generally flat or oval cross-sectional configuration, as distinguished from circular, so that the wires 12 and 13 tend to assume a horizontal adjacent side-by-side relationship when the cable is unwound from a wire reel 41 (FIG. 1) and a segment 11 is laid on a flat horizontal surface S.

As FIGS. 2 and 3 show, plug 15 at the one end of lead 10, which is a European-type plug for example, comprises an electrically non-conductive portion, preferably molded of plastic, including a rigid cross-member 24, from which two integrally formed spaced apart rigid hollow legs 25 and 26 extend and on which a pair of electrically conductive prongs or terminals 27 and 28, respectively, are mounted. The prongs 27 and 28, which are identical to each other, comprise portions which extend through the hollow legs 25 and 26, respectively, and also comprise hollow crimpable end portions 30 and 31 into which the stranded twisted conductors 12A and 13A, respectively, are inserted and crimped to provide mechanical and electrical connections. Plug 15 is adapted to be inserted or molded or enclosed in an insulating housing (not shown) after manufacture of wire lead 10 is completed.

As FIGS. 2 and 3 further show, the terminals 16 and 17 at the other end of lead 10 are identical to each other and each comprises a hollow outer end portion 32 for connection to a mating terminal (not shown) on an electrical appliance (not shown), a split crimpable mid-portion 33 into which an untwisted untinned stranded conductor 12A, 13A is inserted and crimped to provide a mechanical and electrical connection, and a split crimpable inner end portion 34 into which the insulation covering 18, 19 is inserted and crimped to provide a mechanical connection.

FIGS. 5a through 5h in FIG. 5 show the steps or stages in the method of production of wire lead 10 in accordance with the invention which are, for example, carried out on the apparatus in accordance with the invention shown in FIG. 1. For purposes of discussion herein, the ends of wire segment 11 and finished lead 10 are hereinafter designated, where appropriate, as the "plug end" and the "terminal end," referring to the ends at the left and right sides, respectively, of FIGS. 1, 2, 3, and 5.

General Arrangement of Apparatus

The apparatus generally comprises the following mechanisms, namely, a feed mechanism 45 for repeatedly providing a cable segment 11 of predetermined length from a source of supply 40; a main conveyor mechanism 56 for conveying the cable segment 11 along a path; and mechanisms 64 and 90 for stripping portions of the insulating jacket 14 from both ends of the cable segment 11 to expose the ends of the insulated wires 12 and 13 therein and for trim cutting the exposed ends. The apparatus further includes mechanisms (hereinafter described), including a wire shaping device 69, for shaping the wires 12 and 13 at the plug end of the segment and for accurately guiding the shaped ends during subsequent processing steps; a mechanism 80 for simultaneously stripping the wires 12 and 13 and twisting the pair of stranded conductors 12A and 13A at the plug end of the segment 11 while the wires 12 and 13 are held by the wire shaping device 69; a mechanism 85 for attaching a plug 15 to the plug end of the segment 11 while the wires 12 and 13 are held by the wire shaping device 69; and a spreader mechanism 92 for shaping the wires 12 and 13 at the terminal end of the segment 11.

As FIG. 1 also shows, the apparatus also includes mechanisms 94 and 96 for twisting and stripping the wires 12 and 13 at the terminal end of segment 11 to provide a lead end such as shown in FIG. 2A. The apparatus shown in FIG. 1 also includes mechanisms 98 and 100 for fluxing and tinning, respectively, stripped and twisted stranded conductors 12A and 12B to provide a lead end such as shown in FIG. 2B. The apparatus shown in FIG. 1 also includes a mechanism 102 for attaching the connector terminals 16 and 17 to stripped untwisted untinned stranded conductors 12A and 12B, as shown in FIG. 2. It is to be understood, however, that to produce a terminated lead of the type shown in FIG. 2, the mechanisms 98 and 100 could be by-passed or eliminated and stripping means other than the strip-twist mechanisms 94 and 96 could be employed, i.e., a known type which produces untwisted conductors. Furthermore, to produce a lead of the type shown in FIG. 2A, mechanisms 98, 100 and 102 could be by-passed or eliminated, since only mechanisms 94 and 96 are required for a strip-twist end. Furthermore, to produce a lead of the type shown in FIG. 2B, mechanism 102 could be by-passed or eliminated.

The wire shaping mechanisms for preshaping the wires 12 and 13 at the plug end of the cable segment 11 also helps position the wires during further processing and include wire shaping and holding devices 69 movable by an auxiliary conveyor 65 an inserter 70 for directing the wire ends into releasable engagement with a wire shaping device 69, an actuator 73 for causing the wire shaping device 69 to effect wire bending, a wire release mechanism 210 (see FIGS. 28 and 29), and a reset mechanism 71 for resetting the wire shaping device 69.

The mechanism 80, 94, and 96 for stripping the wires 12 and 13 and twisting the ends of the stranded conductors 12A and 13A comprises a gripping device (such as the above-described wire shaping device 69 or a conveyor clamp 54) which prevents axial and rotational movement of the wire 12 or 13, blades 150 and 150A for severing the wire insulation 18 or 19, and rotatable and axially movable spinner head clamps 500 and 500A in a spinner head 151 or 151A which releasably grip, rotate, and axially remove the severed piece of insulation 502, simultaneously twisting the stranded conductor 12A or 13A in the process.

The Feed Mechanism And Main Conveyor

As FIG. 1 shows, the apparatus comprises a feed mechanism 45 for providing cable segments 11 of predetermined length from a source of supply 40; a main conveyor mechanism 56 for conveying the segments 11 along a path; mechanisms 64 and 90 for stripping part of the insulating jacket 14 from both ends of each segment 11 and for simultaneously trim cutting the ends of the exposed insulated wires 12 and 13. The wire dispensing mechanism 40, including wire reel 41 having the cable thereon, supplies a strand 42 of double-conductor insulated stranded cable. Feed mechanism 45 includes a supporting framework 48 and counter-reciprocating wire feed clamps 46 and 47 for drawing the strand 42 from the wire reel 41. Severing mechanism 50 severs a wire segment 11 of predetermined length from the strand 42 while the strand is still held by the wire feed clamps 46 and 47. Releasable conveyor clamps 52 and 54 are provided for gripping and receiving the wire segment 11 from the feed clamps 46 and 47 and for conveying the wire segment 11. The main conveyor mechanism 56 advances the conveyor clamps 52 and 54 and the wire segment 11 therein in steps or stages through the various processing mechanisms, hereinafter described, and to collecting station 57. Conveyor 56 includes a supporting framework 58 on which a pair of laterally spaced apart endless conveyor chains 59 and 61 are movably mounted and the conveyor clamps 52 and 54 are carried by the chains 59 and 61, respectively. The apparatus further includes conveyor clamp actuator mechanisms 60 and 62 near opposite ends of the conveyor 56 for causing the conveyor clamps 52 and 54 to initially receive a wire segment 11 from the feed clamps 46 and 47 for conveyance and to subsequently release the finished wire lead 10 from the conveyor clamps 52 and 54 for deposit at the collecting station 57. U.S. Pat. Nos. 3,918,330 and 3,702,954 owned by the same assignee as the present application, disclose details of mechanisms similar to mechanisms 40, 45, 50 and 56 thus far described.

As FIG. 1 shows, mechanisms 64, 65, 70, 73, 80, 85, 86, and 71 are disposed along the left side of conveyor 56 for processing the plug end of the wire segment 11 and are supported on framework 58. As FIG. 1 further shows, mechanisms 90, 92, 94, 96, 98, 100, and 102 (which are alternatively usable as hereinbefore explained) are disposed along the right side of conveyor 56 for processing the terminal end of the wire segment 11 and are supported on framework 58.

Mechanisms 64 and 90 are provided for stripping predetermined lengths of insulating jacket 14 from the plug end and the terminal end, respectively, of wire segment 11 and for trim cutting the exposed ends of the insulated stranded conductors 12 and 13 at the ends of the wire segment 11 (compare FIGS. 5a and 5b).

The Wire Shaping Mechanisms

Figure 7A:
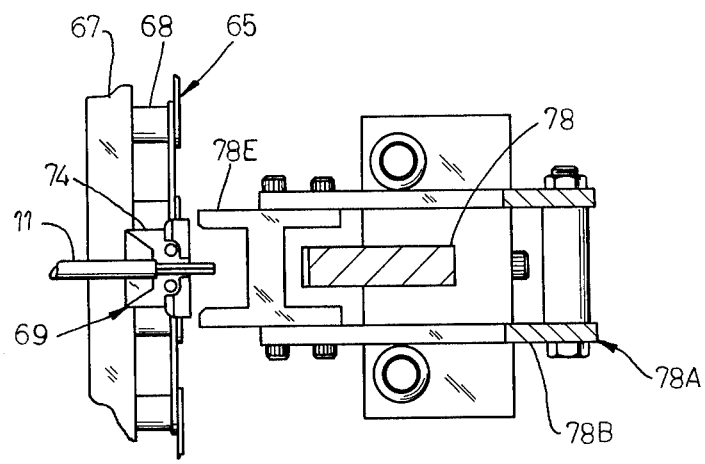
FIG. 7A is a view taken on line 7A—7A of FIG. 7.
Figure 8:
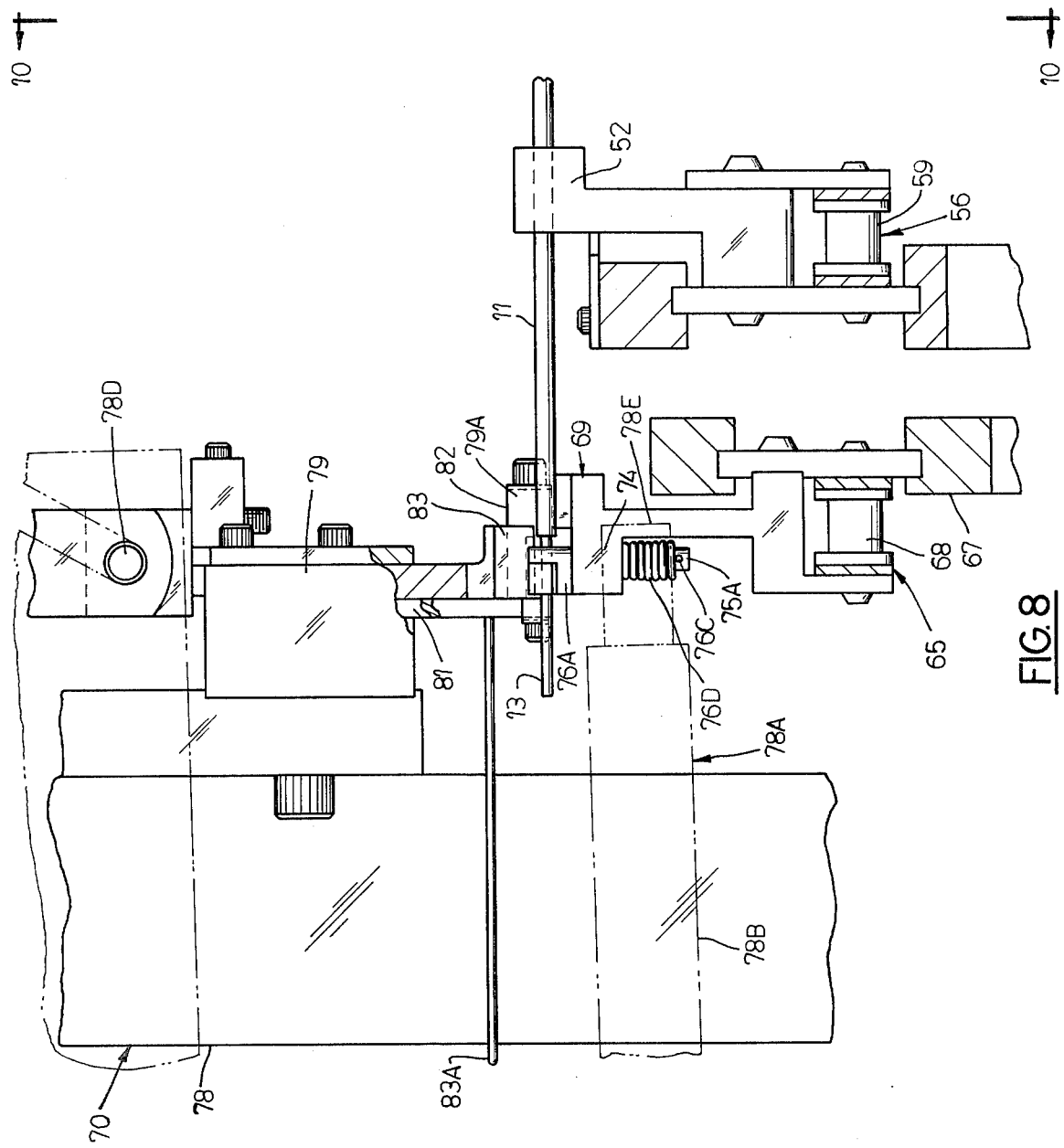
FIG. 8 is an enlarged elevational view of the opposite side of a portion of the mechanism shown in FIG. 7 and depicts it in another operating position.

As FIG. 1 shows, means are provided to grip the stripped and trim-cut plug end of wire segment 11 relatively close to the end thereof, to shape and bend the wires 12 and 13 extending from the plug end of the wire segment, to grip and accurately position the shaped ends of the wires 12 and 13 during subsequent transport of these ends through the processing mechanisms 80 (strip and twist) and 85 (plug attachment), hereinbefore referred to, by the main conveyor 56, and to subsequently release these ends. Such means comprise the auxiliary conveyor mechanism 65 (which operates at the same speed as conveyor 56); the wire shaping (bending) and holding (guiding) devices 69 which are moved by the auxiliary conveyor mechanism 65 along a path parallel to the path of travel of conveyor 56; the inserter mechanism 70 located near the input end of the auxiliary conveyor mechanism 65 which effects initial engagement of the wires 12 and 13 with an associated device 69; the actuator mechanism 73 which cooperates with the device 69 to operate the latter to effect bending and shaping of the wires 12 and 13; the release mechanism 210 (see FIGS. 28 and 29) which is located near the output end of the auxiliary conveyor mechanism 65 and which effects disengagement of the wires 12 and 13 from the device 69 to enable or allow further transport of the wire segment 11 by conveyor 56 to the collecting station 57; and the reset mechanism 71 which resets the movable members 76 and 76A of device 69 after the wires are released therefrom As FIGS. 1, 6, and 7 show, auxiliary conveyor mechanism 65 comprises a supporting framework 67 on which an auxiliary endless conveyor chain 68 is mounted. A plurality of devices 69 are connected at spaced apart intervals along chain 68 and are movable thereby at the same speed as conveyor 56. As FIGS. 1, and 8-18 show, each device 69 comprises a support member or block 74 which is connected to chain 68 and a pair of first members or pins 75 and 75A which are mounted on the block 74 in spaced apart relationship and define a space therebetween for receiving the pair of wires 12 and 13 in side-by-side relationship. A pair of second or pivotable members 76 and 76A are mounted on the pins 75 and 75A, and each movable member has a wire-receiving groove 77 therein for receiving one of the wires 12, 13. The pivotable members 76 and 76A are movable between one position (see FIGS. 9 and 15) wherein the wire-receiving grooves 77 are parallel to each other and aligned with the space between the pins 75 and 75A and another position (see FIGS. 16 and 18) wherein the grooves 77 are in non-parallel relationship relative to each other and non-aligned with the said space. The members 76 and 76A are pivotally supported on block 74 by pivot pins 75 and 75A and these pins carry biasing springs 76D which serve to cause frictional engagement between the second members and the upper surface of support block 74 thereby enabling the members 76 and 76A to remain in the positions into which they are moved. Cotter pins 76C retain the springs 76D.

The inserter mechanism 70 serves as a means for initially directing the wires 12 and 13 which are located above device 69 into the said space and the grooves 77. As FIGS. 6, 7, 10, 11, and 12 show, the mechanism 70 comprises a stationary framework 78 on which a carriage 79 is slideably mounted for reciprocable vertical movement by means of a pneumatic cylinder 70A which is mounted on framework 78. Carriage 79 carries a pair of relatively movable arms 81 and 82 which are swingable between the open position shown in FIG. 10 when the carriage is raised and a closed position shown in FIG. 11 when the carriage is lowered. The jaws 79A and 79B on arms 81 and 82, respectively, guide wire segment 11 and position or center it above device 69 and maintain it in center position as the carriage 79 descends. As FIG. 11 shows, descent of the carriage 79 causes a carriage head 83 thereon to force the wires 12 and 13 into their respective grooves 77. The aforedescribed action of inserter mechanism 70 occurs while the conveyor mechanism 56 and the auxiliary conveyor mechanism 65 are stopped and while the cable segment 11 being operated upon is stationary. The arms 81 and 82 are pivotally connected by pins 79C to frame 78. The movable carriage 79 is provided with a pair of spaced apart rollers 79D which cooperatively engage with the arms 81 and 82 as the carriage 79 descends to thereby cause the arms 81 and 82 to swing together (compare FIGS. 10 and 11). A biasing spring 83A, in the form of a "hair-pin" spring, engages the lower ends of the arms 81 and 82 and tends to bias them apart so that the arms return to the open position shown in FIG. 10 when the carriage 79 is again raised. After inserter mechanism 70 has forced the wires 12 and 13 into their respective grooves 77 on the device 69 and then disengaged therefrom, the auxiliary conveyor 65 and the main conveyor 56 operate to move device 69 (with the end of wire segment 11 therein) to the actuator mechanism 74 for further processing. As FIGS. 6, 7, 7A and 8 show, framework 78 is provided with a locator mechanism 78A which cooperatively engages the device 69 to steady and position it after the latter is moved into position in front of inserter mechanism 70 by the auxiliary conveyor 65. Locator mechanism 78A comprises a pivotable yoke 78B which is pivotably connected by a pin 78C at its upper end to the frame 78 and which is pivotally movable by means of a pin 78D on carriage 79, as the latter descends, into holding engagement with a device 69. The lower end of yoke 78B is provided with a guide block 78E which engages the ends of block 74 of device 69. Guide block 78E releases the block 74 upon retraction of carriage 79 after the wires are inserted into engagement with device 69 to permit device 69 to be moved to the next station whereat actuator mechanism 73 effects wire bending.

Figure 9:
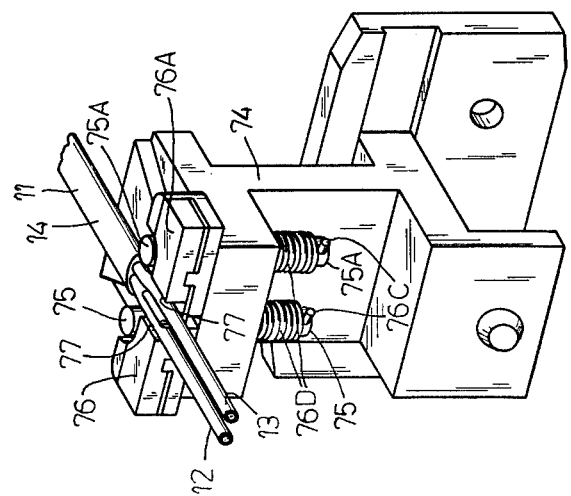
FIG. 9 is an enlarged perspective view of a wire shaping and guiding device shown in FIG. 8 after wire is inserted.
Figure 14:
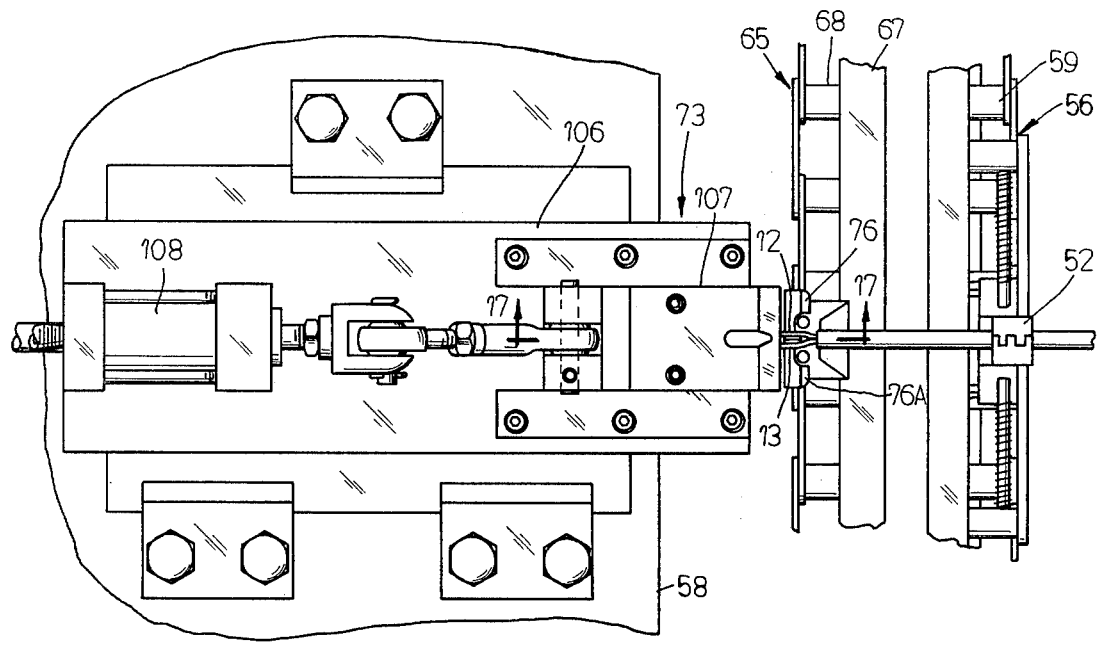
FIG. 14 is a top plan view of the mechanism shown in FIG. 13.
Figure 13:
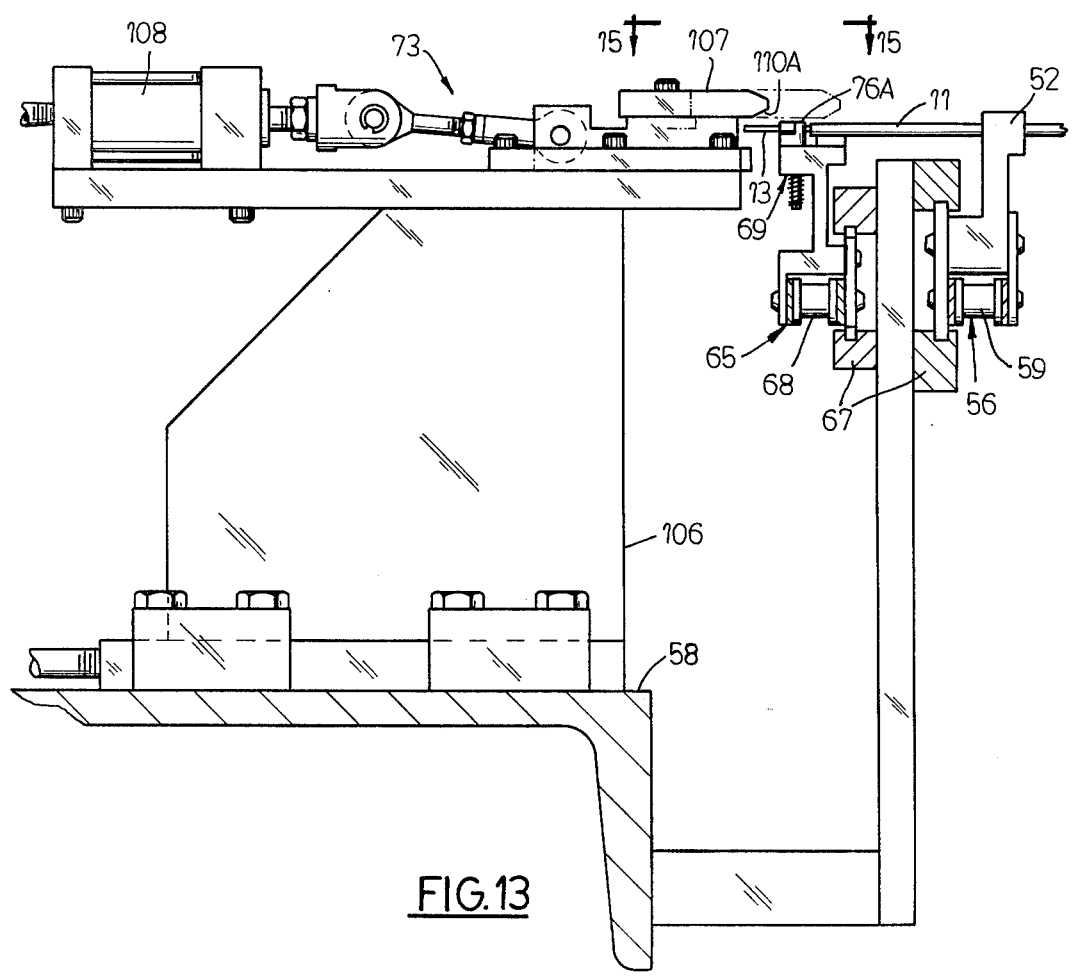
FIG. 13 is an enlarged cross-sectional view of an actuator mechanism taken on line 13—13 of FIG. 1.
Figure 15:
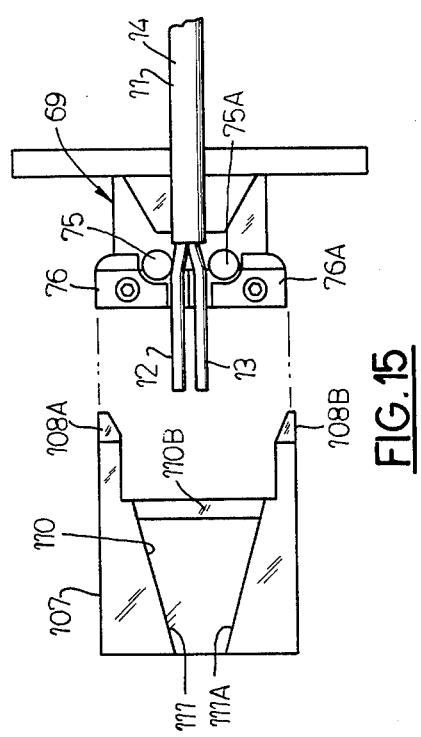
FIG. 15 is an enlarged top plan view taken on line 15—15 of FIG. 13.
Figure 16:
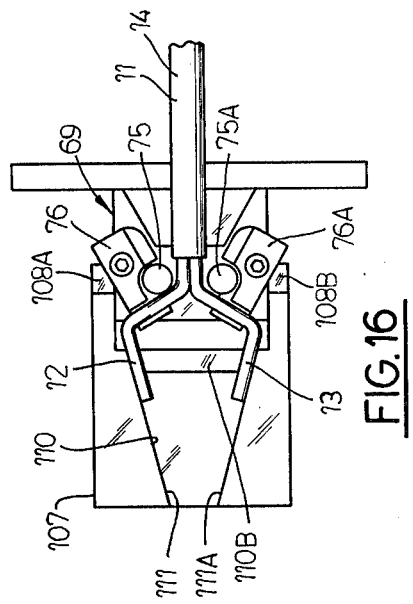
FIG. 16 is a view similar to FIG. 15 but showing the components in another operating position.
Figure 17:
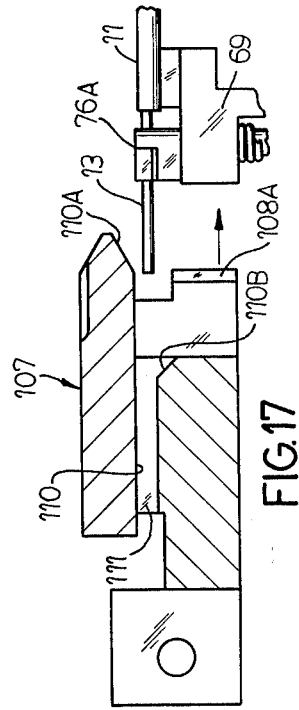
FIG. 17 is an enlarged cross-sectional view taken on line 17—17 of FIG. 14.
Figure 18:
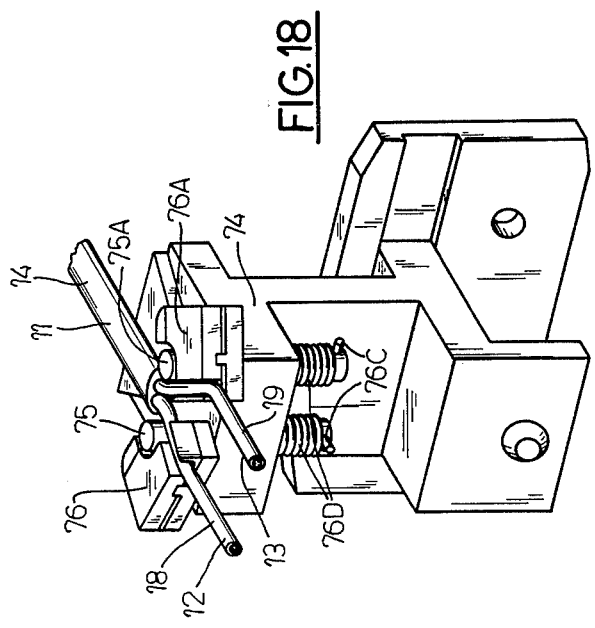
FIG. 18 is a view similar to FIG. 9 but showing the components of the wire bending device after a wire is treated by spreader.
Figure 21:
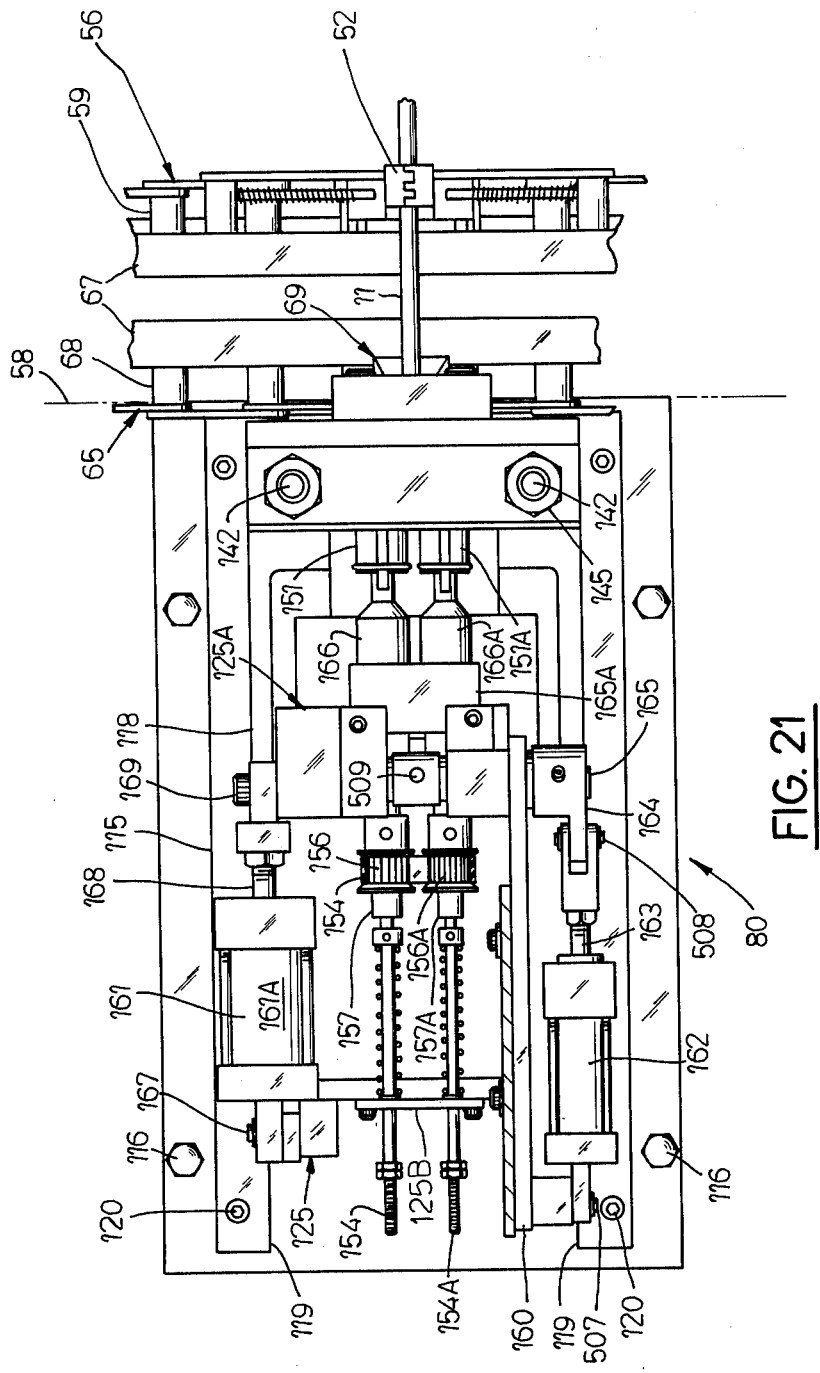
FIG. 21 is a top plan view taken along line 21—21 of FIG. 19.
Figure 27:
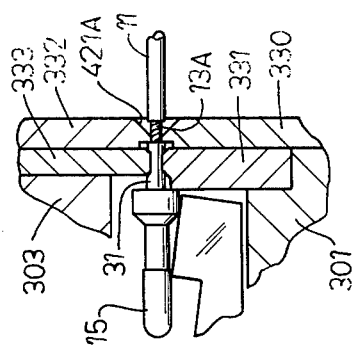
FIG. 27 is an enlarged cross-sectional view of a portion of the mechanism shown in FIG. 26.
Figure 29:
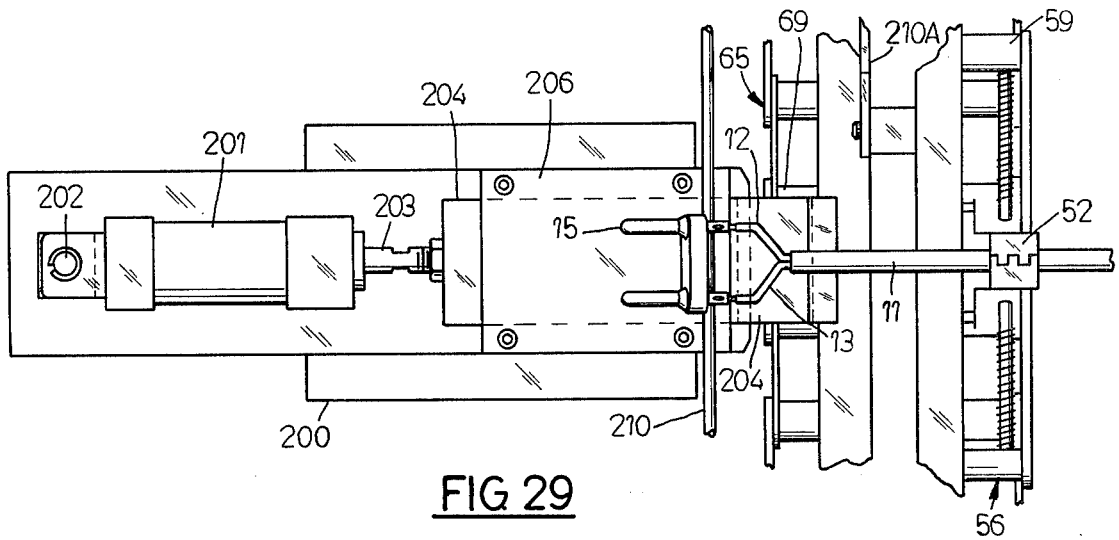
FIG. 29 is a top plan view of the mechanism shown in FIG. 28.
Figure 28:
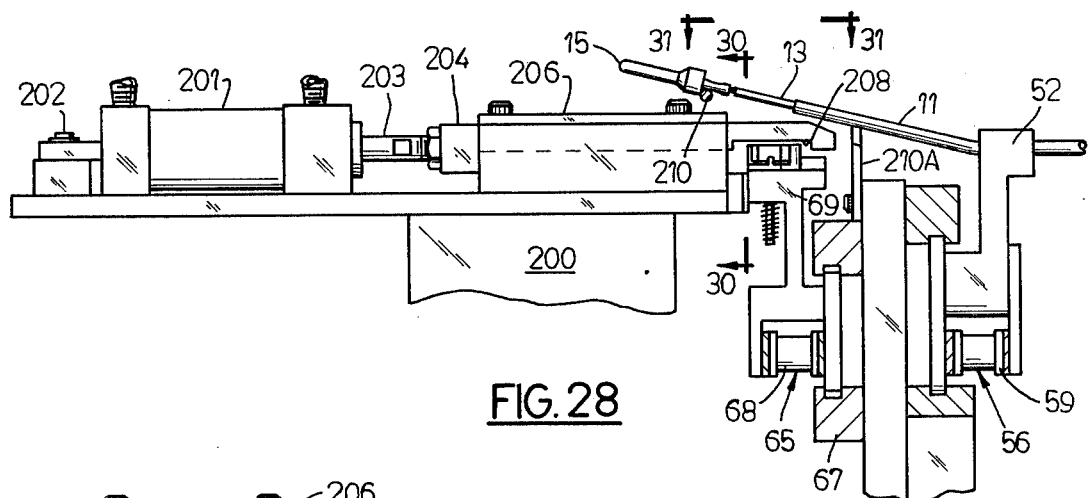
FIG. 28 is an enlarged side elevational view of a reset mechanism and is taken on line 28—28 of FIG. 1.
Figure 30:
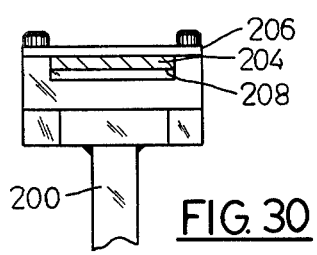
FIG. 30 is a cross-sectional view taken on line 30—30 of FIG. 28.
Figure 31:
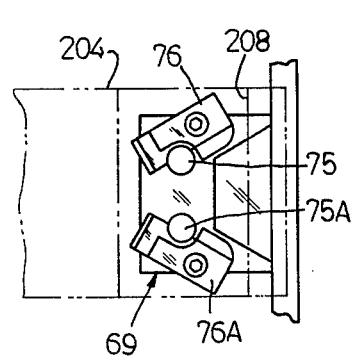
FIG. 31 is an enlarged top plan view of the wire bending device as shown in FIGS. 28 and 29.

When the wires 12 and 13 are disposed as shown in FIG. 15, the actuator mechanism 73 operates to effect pivotal movement of the movable members 76 and 76A of device 69 from the position shown in FIGS. 9 and 15 to the position shown in FIGS. 16 and 18 thereby effecting bending and shaping of the ends of the wires 12 and 13 around the pins 75 and 75A. As FIGS. 13–18 show, actuator mechanism 73 comprises a supporting framework 106 on which an actuator slide block 107 is slideably mounted for reciprocal movement in the horizontal direction by means of a pneumatic cylinder 108 which is mounted on frame 106. Slide block 107 includes a pair of ears 108A and 108B which are advanced to engage and effect movement of the members 76 and 76A, respectively, thereby causing initial bending movement of the wires 12 and 13. Slide block 107 also includes a tapered passage 110 having tapered walls 111 and 111A which engage the tips of the wires 12 and 13 and cause an additional bend therein as comparison of FIGS. 15 and 16 show. The walls 111 and 111A effect bending of the wires 12 and 13 relative to the movable members 76 and 76A, whereas the members 76 and 76A effect bending of the wires relative to the pins 75 and 75A, respectively. Slide block 107 includes upper and lower inclined surfaces 110A and 110B to effect vertical guiding of wires 12 and 13 into tapered passage 110. When the shaping and bending operation is carried out and the slide block 107 is retracted, the conveyors 56 and 65 again commence operation to move the wire segment 11 to the next processing mechanisms 80 and 85. When the processing mechanisms 80 and 85 perform their function as hereinafter explained, the release mechanism effects disengagement of the wire segment 11 from the device 69 so that the segment may be transported by conveyor 56 to collection station 57. As FIGS. 28 and 29 show, the wire release mechanism includes a guide wire 210 and guide 210A extending parallel to and slightly above auxiliary conveyor 65 has already engaged the underside of the plug 15 which is attached to segment 11 and caused the wires 12 and 13 to be dislodged or disengaged from the device 69 in readiness for further transport by main conveyor 56. However, even though the plug end of the segment 11 is disengaged from device 69, the movable members 76 and 76A are still disposed in their aforesaid other or wire-bending position, as shown in FIG. 31. Accordingly, it is necessary to reset these moveable members 76 and 76A to their initial wire-receiving position.

Figure 32:
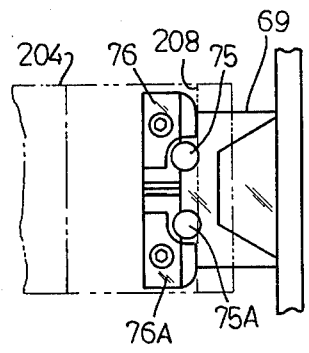
FIG. 32 is a view similar to FIG. 31 but shows the components of the device in another operating position.
Figure 33:
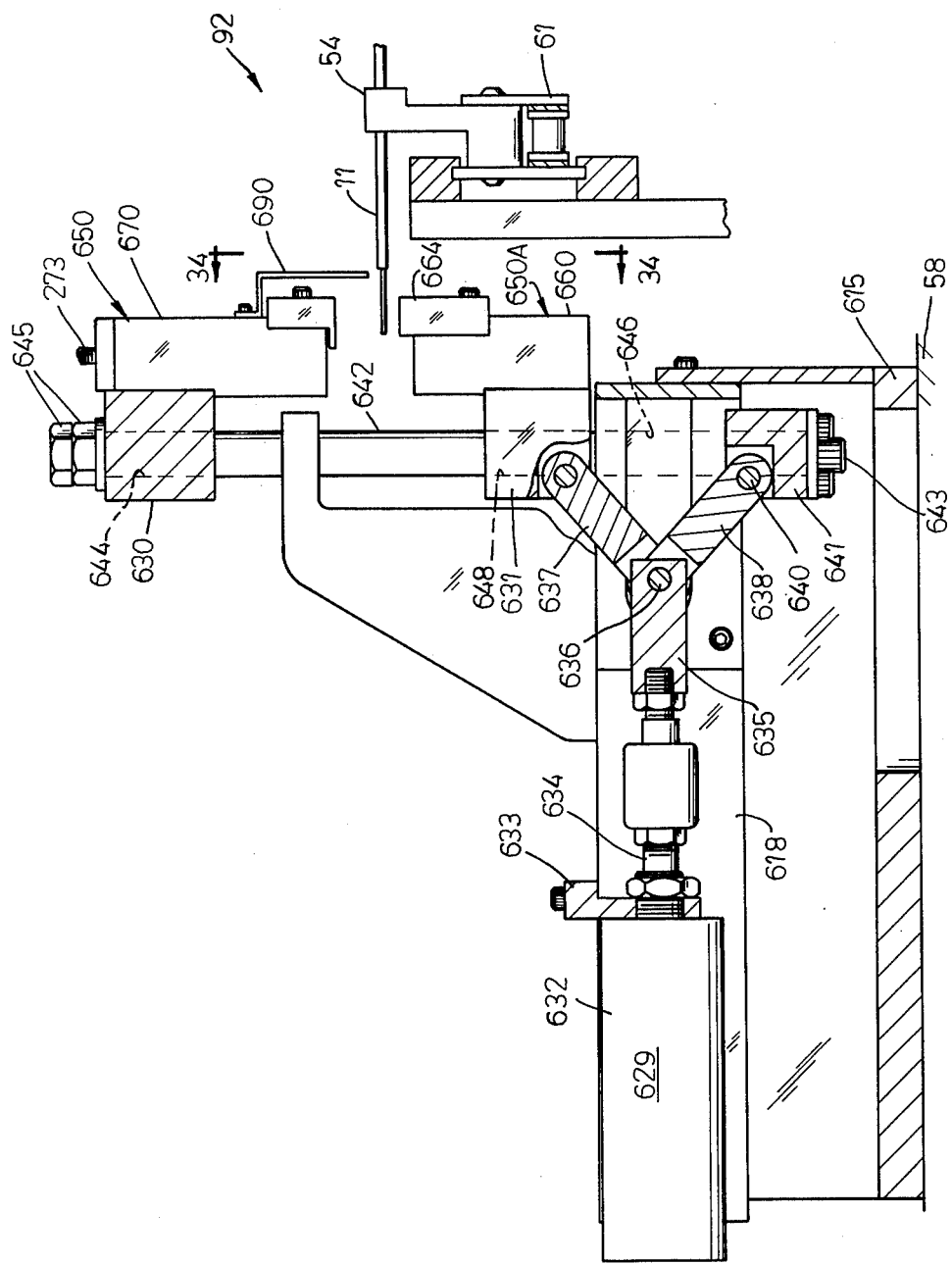
FIG. 33 is an enlarged cross-sectional view of the wire spreader mechanism for an end of the cable segment and is taken on line 33—33 of FIG. 1.
Figure 34:
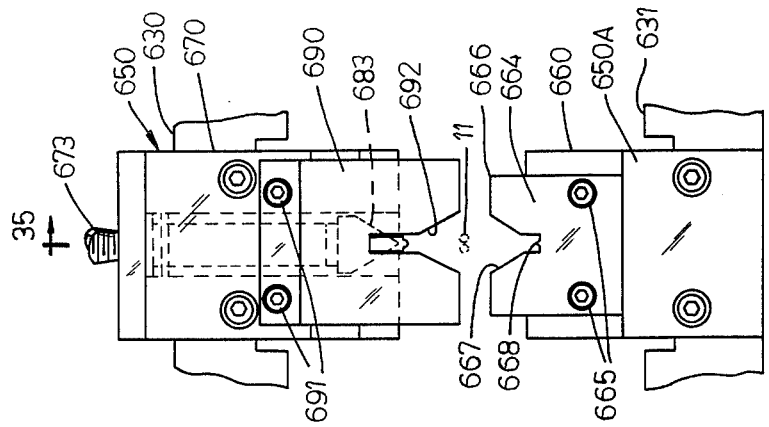
FIG. 34 is an elevational view taken on line 34—34 of FIG. 33.

Reset is accomplished by actuating pneumatic cylinder 201 to cause reset slide 204 to move leftward with respect to FIGS. 28, 29, 31, and 32 thereby causing the movable members 76 and 76A of device 69 to assume the position shown in FIG. 32. As FIGS. 28, 29, 30, 31, and 32 show, the reset mechanism 71 comprises a supporting framework 200 on which a pneumatic operating cylinder 201 is mounted as by a pin 202. Cylinder 201 effects horizontal reciprocating movement of its piston rod 203 which is connected to a reset slide 204. Slide 204 is slideably mounted within a supporting structure 206 on supporting framework 200. Reset slide 204 is provided on the undersurface of its outermost end with a recess 208. When slide 204 is fully extended by pneumatic operating cylinder 201, the recess 208 assumes the position shown in FIGS. 28, 29, and 31. In this position, recess 208 of slide 204 receives a device 69, hereinbefore described, which is being transported by auxiliary conveyor 65. After each device 69 is reset, pneumatic cylinder 201 is actuated to move reset slide 204 rightward with respect to FIG. 28 thereby placing it in readiness for the next resetting operation. As FIG. 1 makes clear, each device 69 after being reset is carried around the discharge end of the auxiliary conveyor 65, along the underside thereof, and upwardly around the input end of the auxiliary conveyor thereby positioning the device 69 in readiness for another wire-receiving operation.

The Stripping and Twisting Mechanism

As FIGS. 19, 20, 21, and 22 show, mechanism 80 is provided for stripping a predetermined length of the insulation from the exposed ends of the insulated stranded shaped conductors 18 and 19 at the plug end of wire segment 11 (compare FIGS. 5e and 5f) and for simultaneously twisting the exposed ends of the stranded conductors 12A and 13A (compare FIGS. 5e and 5f). Broadly considered, mechanism 80 requires a gripping device (such as the above-described wire shaping device 69) which prevents axial and rotational movement of the wires 12 and 13, and comprises blades 150 and 150A for severing the wire insulation 18 and 19, and rotatable and axially movable spinner head clamps 500 and 500A in a spinner head 151 (and 151A) which releasably grip, rotate, and axially remove the severed piece of insulation 502, simultaneously twisting the stranded conductor 12A or 13A in the process. More specifically, mechanism 80 comprises a rigid stationary supporting frame 115 which is understood to be secured to frame 58 by suitable means (not shown). Frame 115 supports an upper frame 118 which is rigidly mounted thereon. Upper frame 118 supports a pedestal 125 which is secured thereto by screws 126. Upper frame 118 supports a pneumatic ram 129 which operates the upper and lower guide heads 130 and 131, respectively, on which upper and lower insulation cutting blades 150 and 150A, respectively, are mounted. Cylinder housing 132 of ram 129 is rigidly secured as by a bracket 133 to upper frame 118. Piston rod 134 of ram 129 is connected to a link 135 which in turn is connected by means of a link pin 136 to a pair of upwardly and downwardly extending links 137 and 138. As comparison of FIGS. 22 and 19 shows, retracting movement of the piston rod 134 of ram 129 causes the links 137 and 138 to draw together (see FIG. 19) and cause the upper and lower blades 150 and 150A, respectively, to draw apart or open. Conversely, extension of piston rod 134 causes expansion of the links 137 and 138 (see FIG. 22) thereby causing the blades 150 and 150A to come together or close to effect an insulation cutting operation. More specifically, the lower link 138 is connected by a pin 140 to a block 141 and a pair of cylindrical sliding rods 142 are secured to block 141 by screws 143 and extend upwardly therefrom. The upper head 130 comprises a pair of spaced apart rod-receiving holes 144 through which the rods 142 extend and the ends of the rods are threaded to receive nuts 145 which secure the head 130 to the rods. The upper end of each rod 142 has a biasing spring (not shown) disposed therearound. When block 141 is moved downward by link 138, the rods 142 move downward therewith, thereby causing the upper head 130 and blade 150 to move downward. The rods 142 are slideable in openings 146 in upper frame 118 and are partially supported therein. The lower head 131 is pivotally connected to link 137 by a pivot pin 147 and the lower head 131 is provided with openings 148 through which the rods 142 extend. In other words, lower head 131 is relatively slideable on the rods as the lower head is moved upwardly or downwardly by link 137 in response to operation of ram 129. The guide heads 130 and 131 carry blades 150 and 150A which effect insulation cutting on the wires 12 and 13 before subsequent stripping and twisting.

As FIGS. 19, 20, 21, 22, and 40–43 make clear, pedestal 125 slideably supports a rotary stripper carriage 125A which is movable toward and away from the plug end of cable segment 11 by means of a pneumatic ram 161. Pedestal 125 includes a support plate 125B on which a pair of spring-biased spaced apart push rods 154 and 154A are mounted. The spinner heads 151 ad 151A are integral with hollow drive shafts 157 and 157A, respectively, into which the push rods 154 and 154A, respectively, extend. The hollow drive shafts 157 and 157A are rotatably mounted on the carriage 125A and are movable axially as the carriage is moved by pneumatic ram 161 and are, therefore, axially movable relative to the push rods 154 and 154A, respectively. The cylinder ram 161 is secured to pedestal 125 by a pin 167 and the piston rod 168 of ram 161 is connected by a bolt 169 to carriage 125A. The drive shafts 157 and 157A are rotatable by means of an electric motor 152 which is mounted on and movable with carriage 125A. Motor 152 has a rotatable drive shaft 153 which is connected by means of a pulley 154 and an endless flexible drive belt 155 to pulleys 156 and 156A which are mounted on and connected to drive the drive shafts 157 and 157A, respectively. As FIGS. 40–43 best show, the spinner heads 151 and 151A are each provided with a slot 151B which accommodates the spinner head clamps 500 and 500A. The clamps 500 and 500A are pivotally connected to head 151 by pins 503 and 503A and are biased to open position by means of an elastic O-ring 504 which encircles the exterior of the head and engages the rear ends of the clamps. The clamps 500 and 500A in the heads 151 and 151A are actuatable to clamped or gripping position by means of actuator spools 166 and 166A which are slideably mounted on the rotatable shafts 157 and 157A, respectively. The actuator spools 166 and 166A are movable from a rearward position shown in FIGS. 19, 21, and 40 to a forward position shown in FIGS. 22 and 41 by means of a pneumatic ram 162. The cylinder of ram 162 is connected by a pin 507 to a side support plate 160 of carriage 125A. The piston rod 163 of ram 162 is connected by a pin 508 to one end of a lever arm 164 and the other end of the lever arm is rigidly secured to a rotatable shaft 165 which is supported on support plate 160 of carriage 125A. A second lever arm 164A is rigidly secured at one end to rotatable shaft 165 and is pivotally secured at its other end by a pin 509 and a link 164A to a yoke 165A which is slideably mounted on carriage 125A and engages circumferential grooves 511 in the actuator spools 166 and 166A. Extension of piston 163 from the position shown in FIGS. 19 and 40 to the position shown in FIGS. 22 and 41 causes the actuator spools 166 and 166A to advance to the position shown in FIGS. 22 and 41. As comparison of FIGS. 40 and 41 makes clear, entry and engagement of the tapered forward end of the actuator spool 166 beneath the rear ends of the clamps 500 and 500A causes closure of the clamps on the severed piece of insulation 502. The advance and retract movement of the twist heads 151 and 151A and the operation of the spinner head clamps 500 and 500A are synchronized with the movement of the insulation cutting blades 150 and 150A so that as soon as wires 12 and 13 are properly located, the twist heads 151 and 151A advance and receive the insulated stranded conductors 12 and 13 therewithin, respectively, and the clamps 500 and 500A grip the severed pieces of insulation 502. As the twisted heads 151 and 151A are retracted, while spinning and while the clamps 500 and 500A are still closed, the severed piece of insulation 502 is withdrawn thereby causing insulation stripping and twisting of the stranded conductors 12A and 13A (compare FIGS. 5e and 5f).

In operation, when a wire segment 11 has been moved into proper position by the conveyor clamps 52 and 54, with the ends of the wires 12 and 13 gripped by the device 69, as hereinbefore explained, ram 129 causes blades 150 and 150A to close, the causing the ram 161 to move the carriage 125A forward from the position shown in FIG. 19. At this point, the ram 162 is extended as FIG. 22 shows, to actuate the clamps 500 and 500A of the twist heads to grip the cut insulation 502. Thereupon the ram 161 operates to retract the carriage 125A and the twist heads thereon, thereby causing the strands to be twisted as the cut insulation 502 is removed. Subsequently, the ram 162 retracts the actuator spool 166, the clamps 500 and 500A open, and the spring biased rod 154 moves forward to eject the cut piece of insulation. In actual operation, the extension and retraction of the cylinders 161, 162, and 129 occurs in timed and coordinated relationship.

Figure 39:
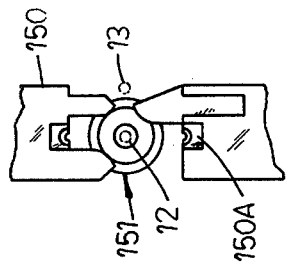
FIG. 39 is an enlarged view taken on line 39—39 of FIG. 38.
Figure 38:
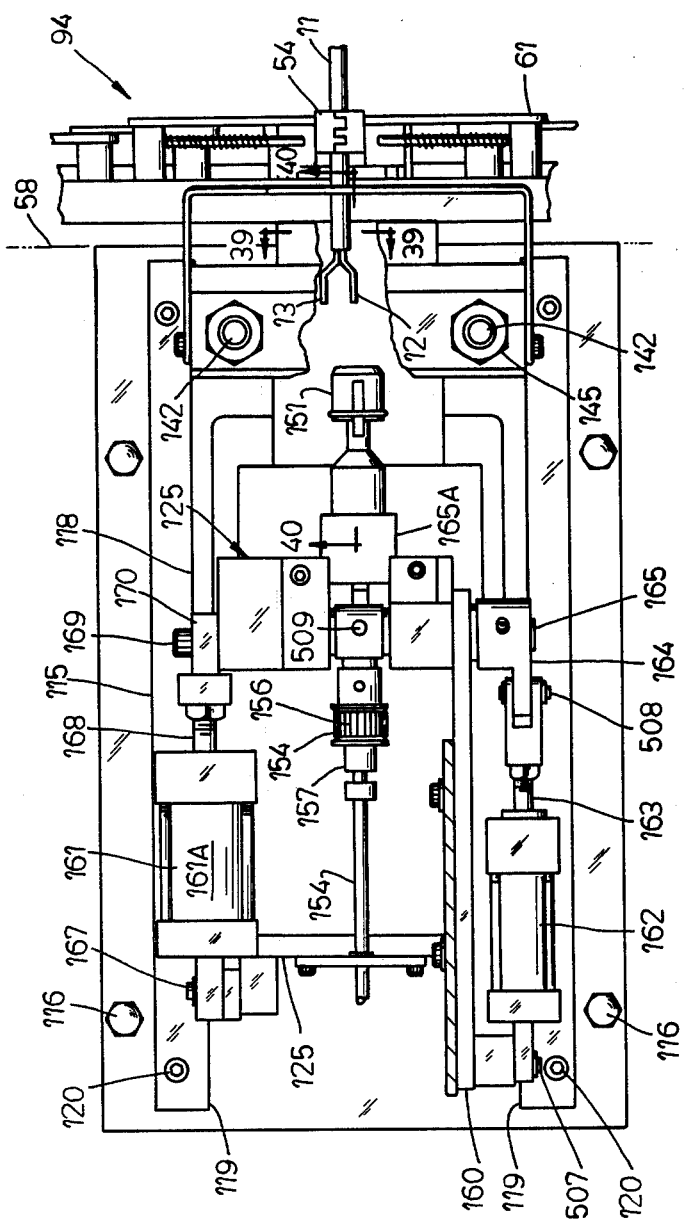
FIG. 38 is a top plan view, with portions removed to disclose interior details, of one of the wire stripper and twister mechanisms for an end of a cable segment shown in FIG. 1.

As FIGS. 1, 38 and 39 make clear, mechanism 94 for the other end of cable segment 11, which is identical to mechanism 96 in construction and mode of operation, is provided to individually strip a predetermined length of insulation cover 18 from the exposed end of the insulated stranded shaped conductor 12A at the other end of wire segment 11 and then twist the strands (compare FIGS. 5c and 2A). As FIGS. 38 and 39 show, the mechanism 94 for stripping the wire 12 and twisting the end of the stranded conductor 12A requires a gripping device (such as the abovedescribed conveyor clamp 54) which prevents axial and rotational movement of the wire 12. Except for the fact that mechanism 94 employs a single stripper head 151, it is in all other respects similar to mechanism 80 hereinbefore described and, accordingly, similar parts bear similar reference numerals. In mechanism 94, the blades 150 and 150A sever the wire insulation 18, and the rotatable and axially movable spinner head clamps 500 and 500A in spinner head 151 releasably grip, rotate, and axially remove the severed piece of insulation 502, simultaneously twisting the stranded conductor 12A in the process.

The Plug Attachment Mechanism

Figure 26:
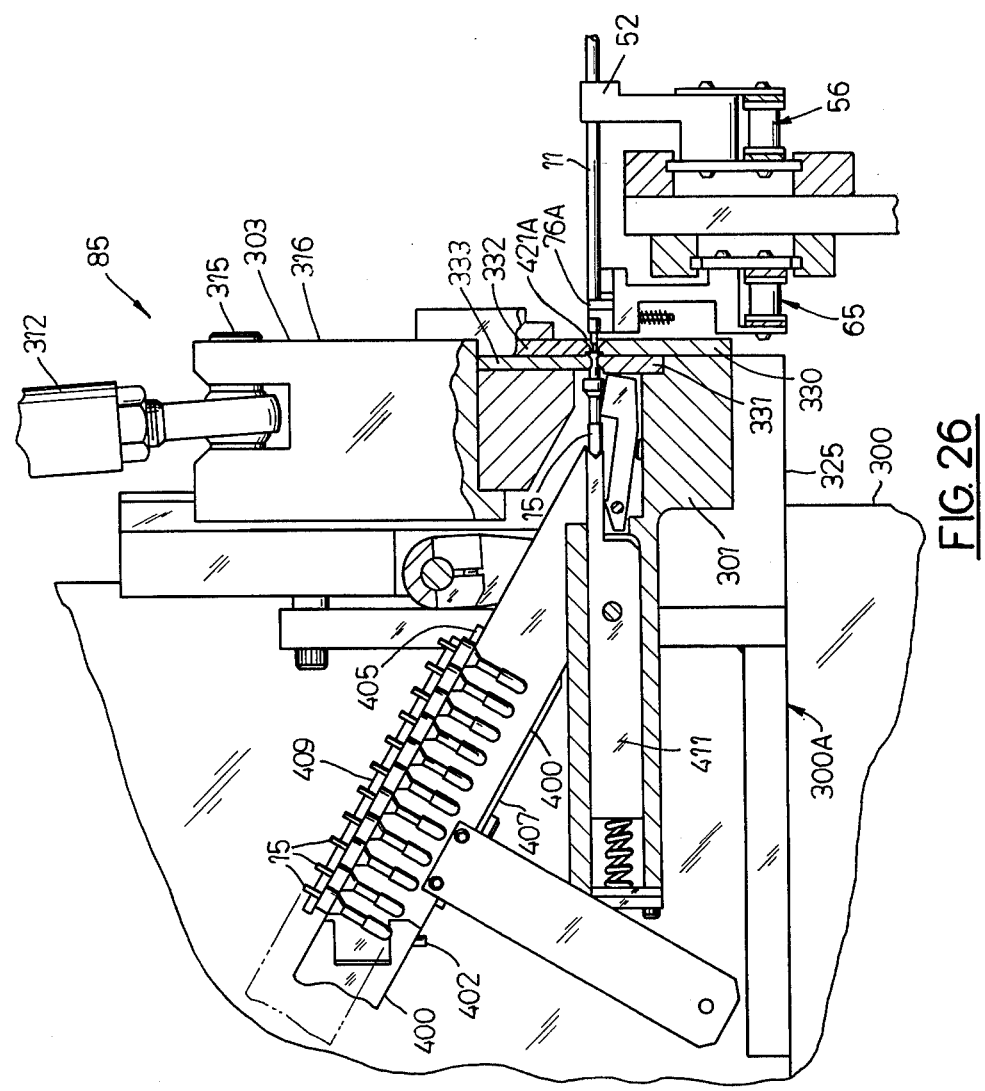
FIG. 26 is a view similar to FIG. 23 but showing the mechanism in another operating position.

As FIGS. 1 and 23 through 27 show, the mechanism 85 receives a series of plugs 15 from feeder assembly 86 and simultaneously attaches the plug terminals 30 and 31 to the twisted ends of the stranded conductors 12A and 13A, respectively, at the plug end of wire segment 11 (compare FIGS. 5f and 5g). Mechanism 85 includes a supporting framework 300 on which a horizontally movable head assembly 300A is mounted. Head 300A is movable by means of a drive mechanism 300B (shown schematically, FIG. 23). Head assembly 300A includes a lower stationary platen 301 and a relatively movable terminal attachment head 303. Lower platen 301 includes a funnel plate 330 and a crimping plate 331. The movable head 303, which includes a funnel plate 332 and a crimping plate 333, is reciprocably movable vertically by means of a rotatable driven shaft 306 which drives an eccentric pin 311. The funnel plates 330 and 332, when closed, cooperate to define funnels 421 and 421A, as FIGS. 23 and 24 show. Eccentric pin 311 is pivotally connected to one end of a drive linkage 312 and the other end of the drive linkage is pivotally connected to a pin 315 which is mounted on block 316. Drive linkage 312 is threaded to receive an eyebolt which engages pin 315. As shaft 306 rotates and drives eccentric pin 311 in a circular path, the drive linkage 312 and a head 303 attached thereto move reciprocably therewith. As FIGS. 23 and 26 show, the lower stationary platen 301 is adapted to receive and hold each plug 15 in proper orientation so as to receive the twisted conductors 12A and 13A. In operation, movable assembly 300A with a plug 15 therein is moved rightward (with respect to FIG. 23) and the movable head 303 descends so that the funnel plates 330 and 332 fully close before the plug 15 reaches the funnels 421 and 421A. Drive mechanism (see FIG. 26) effects reciprocal horizontal movement of the carriage 325, with a plug 15 abutting the back of the funnels 421 and 421A, toward the plug end of the segment 11, and as this movement occurs, the twisted conductors 12A and 13A enter the hollow cylindrical portions 30 and 31, respectively, of the plug prongs. After this occurs, the drive linkage 312 operates to cause head 303 to descend and crimp the portions 30 and 31 thereby securing the conductors 12A and 13A therein. The head 303 then retracts upwardly and the carriage moves away from the attached plug 15 in readiness to receive a new plug 15 for a subsequent plug attachment operation. Lever 334 lifts plug 15 up to assure release from the die plate 331.

As FIGS. 1, 24, 25, 26, and 27 show, feeder assembly 86 supplies plugs 15 to mechanism 85 in the following manner. The plugs 15 are aligned on a track 400 and the hopper 401 (FIG. 1) feeds the plugs into a position so that they stack up behind stop member 405. Track 400 has some flexibility, by means of pin 402, so that the track can bend or shift as head 300A moves, but is never disconnected from the hopper 401. As the machine 85 cycles each time, an air cylinder 406 activates and moves a lever 407 to lower the stop member 405 and allow a plug 15 to drop down. To prevent more than one plug from dropping down at the same time, the stop member 405 is located next to the area below the next plug 15 and pin 408 thereat clamps the next plug in place against an upper rail 409. The pin 408 on track 400 and upper rail 409 fit therebetween so that one plug 15 is clamped in before the other plug is released as the stop 405 comes down. A released plug 15 falls down into the position shown, i.e., laying on its side, and then slides further down by gravity when lying in that position. The plug 15 is then pushed by linkage assembly 411 from the position shown rightward until the ends of the barrels 30 and 31 abut the funnel plates 330 and 332.

Plug 15 is then lined up with funnels 421 and 421A. The entire head 303 with the plug 15 in place in the funnels 421 and 421A slides forward to the twisted conductors 12A and 13A thereby inserting them into the plug terminals 30 and 31.

After the plug 15 is attached to segment 11, the main conveyor 56 and the auxiliary conveyor 65 move simultaneously to advance the finished lead 10 toward the discharge end of main conveyor 56. As such movement occurs, the finished lead 10 rides up upon the end of guide wire 210, shown in FIGS. 28 and 29, whereby the finished lead 10 is disengaged from the device 69 and able to be further conveyed by main conveyor 56 toward collection station 57. When a finished lead 10 has reached the discharge end of main conveyor 56, the conveyor clamp actuator mechanism 63 at the discharge end of conveyor 56 causes the conveyor clamps 52 and 54 to open and release the finished lead 10 therefrom and deposit the finished lead 10 in the collecting station 57.

The Spreader Mechanism

As FIGS. 1 and 33 through 36 show, the spreader mechanism 92 is provided for spreading and shaping the exposed ends of the insulated stranded conductors 18 and 19 at the terminal end of wire segment 11 (compare FIGS. 5b and 5c), while the segment is held near that end by a conveyor clamp 54 of main conveyor 56. Mechanism 92 comprises a rigid stationary supporting frame 615 which is understood to be secured to frame 58 by suitable means (not shown). Frame 615 supports an upper frame 618 which is rigidly mounted thereon. Upper frame 618 supports a pneumatic ram 629 which operates the upper and lower supports 630 and 631, respectively, on which upper and lower shaper heads 650 and 650A, respectively, are mounted. Cylinder housing 632 of ram 629 is rigidly secured as by a bracket 633 to upper frame 618. Piston rod 634 of ram 629 is connected to a link 635 which in turn is connected by means of a link pin 636 to a pair of upwardly and downwardly extending links 637 and 638. Retracting movement of the piston rod 634 of ram 629 causes the links 637 and 638 to draw together and cause the upper and lower heads 650 and 650A, respectively, to draw apart or open (see FIGS. 34 and 35). Conversely, extension of piston rod 634 causes expansion of the links 637 and 638 thereby causing the heads 650 and 650A to come together or close to effect a wire spreading operation (see FIGS. 36 and 37). More specifically, the lower link 638 is connected by a pin 640 to a block 641 and a pair of cylindrical sliding rods 642 (only one shown) are secured to block 641 by screws 643 and extend upwardly therefrom. The upper support 630 comprises a pair of spaced apart rod-receiving holes 644 (only one shown) through which the rods 642 extend and the ends of the rods are threaded to receive nuts 645 which secure the support 630 to the rods. The upper end of each rod 642 has a biasing spring (not shown) disposed therearound. When block 641 is moved downward by link 638, the rods 642 move downward therewith, thereby causing the upper support 630 and head 650 to move downward. The rods 642 are slideable in openings 646 in upper frame 618 and are partially supported therein. The lower support 631 is pivotally connected to link 637 by a pivot pin 647 and the lower support 631 is provided with openings 648 (only one shown) through which the rods 642 extend. In other words, lower support 631 is relatively slideable on the rods as the lower support is moved upwardly or downwardly by link 637 in response to operation of ram 629. The supports 630 and 631 carry heads 650 and 650A which effect spreading and shaping of the wires 12 and 13 befoe subsequent processing.

Lower shaper head 650A comprises an upper surface 660 having a wire-receiving recess 661 therein and a blade-receiving slot 662 extending downwardly from said recess. A wire guide block 664 is secured to the face of shaper head 650A by bolts 665 and is provided with an upper surface 666 in which a downwardly extending wire-guide slot 667 is provided. Slot 667 is wider at the top than at the bottom and is provided at the bottom with an upwardly extending projection 668 which is insertable between the wires 12 and 13 when the latter are at the bottom of the slot and forces the wires against the sides of the slot.

Upper shaper head 650 comprises an upper portion 670 having a bore 671 therein for accommodating a pneumatically actuated piston rod 672 which is slideably mounted therein. One (upper) end of bore 671 communicates with a source of compressed air by means of an air supply line 673 which is connected in a threaded hole 674 at the upper end of upper portion 670 of shaper head 650. The bore 671 is provided with a shoulder of flange 677 on which the lower end of a helical compression type biasing spring 678 is supported. The upper end of spring 678 bears against an annular flange 680 formed on piston rod 672 and acts to bias the latter upward. An O-ring seal 681 on piston rod 678 forms a seal between the latter and the wall of bore 671 to enable compressed air from line 673 to move the piston rod downward. Piston rod 678 has a generally triangularly shaped wire-shaping and spreading blade 683 rigidly secured to its lower end and bore 671 includes outwardly extending slots 685 near its lower end for accommodating blade 683. The slots 685 extend through the bottom of upper portion 670 of shaper head 650. A wire guiding blade 690 is rigidly connected to upper shaper head 650 by bolts 691 and is provided with a wire guide slot 692.

Figure 35:
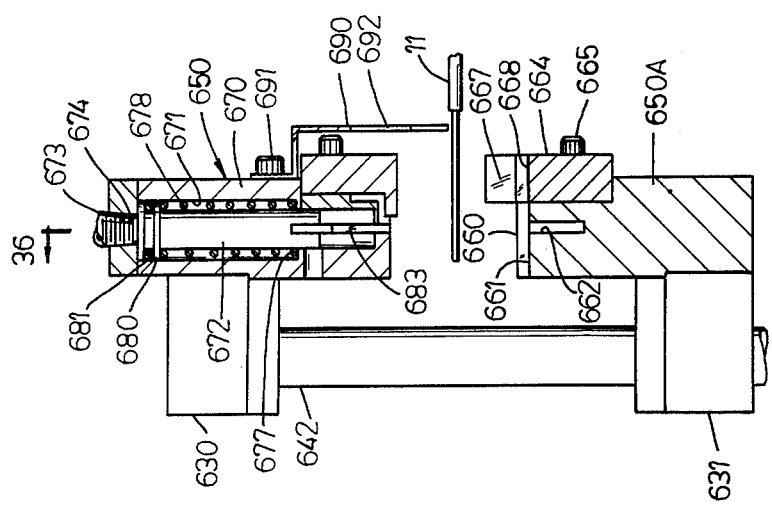
FIG. 35 is a cross-sectional view taken on line 35—35 of FIG. 34.
Figure 36:
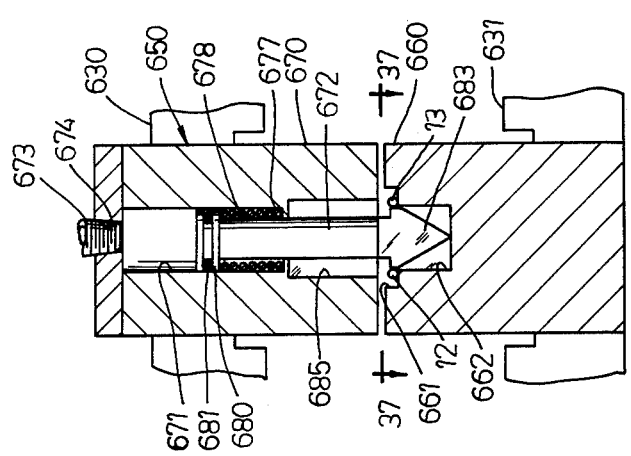
FIG. 36 is a cross-sectional view taken on line 36—36 of FIG. 35 but showing parts in a different operating position.
Figure 37:
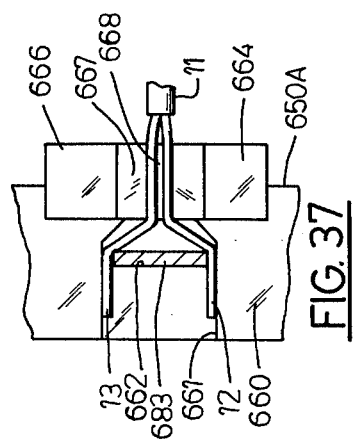
FIG. 37 is a partial plan view taken on line 37—37 of FIG. 36.

In operation, when wire segment 11 is moved to the position shown in FIG. 35, the upper and lower shaper heads 650 and 650A, respectively, are moved together as hereinbefore described thereby causing the wires 12 and 13 to be received and entrapped within the slots 692 and 667 of guide blade 690 and guide block 664, respectively. Then, piston rod 678 is caused to extend downwardly and its blade 683 enters between the wires 12 and 13 forcing them apart, as shown in FIG. 37, against the side walls of wire-receiving recess 661 in shaper head 650A, thereby shaping the wires at the terminal end of the segment 11 as shown in FIG. 37 and FIG. 5. After shaping, the piston rod 678 and its blade 683 are retracted upwardly, the shaper heads 650 and 650A separate and the wire segment 11 is ready to be moved by main conveyor 56 to the next processing operation.

If a lead end such as shown in FIG. 2B is to be provided, the shaped wires 12 and 13 are stripped and twisted by the mechanisms 92 and 94 and mechanism 98 is employed to apply soldering flux to the exposed twisted ends of the conductors 12A and 13A prior to their being tinned or dip-coated with solder by the mechanism 100. The mechanisms 98 and 100 are known commercially available pieces of equipment and may take any suitable form.

If a lead end such as shown in FIG. 2 is to be provided, the shaped wires 12 and 13 are stripped (but not twisted) by conventional strippers and mechanism 102 is employed to simultaneously attach the terminals 16 and 17 to the untwisted conductors 12A and 13A, respectively, at the terminal end of segment 11 (compare FIGS. 5g and 5h). Mechanism 102 may, for example, incorporate two mechanisms which take the form of similar mechanisms shown in U.S. Pat. Nos. 3,668,764 and 2,908,910 owned by the same assignee as the present application.

As will be understood, each stranded conductor 12A, 13A may be processed as follows, depending which processing mechanisms at the terminal end of the segment 11 are employed: untwisted and bare; untwisted and tinned; untwisted and untinned and having a terminal thereon; untwisted and tinned and having a terminal thereon; twisted and bare; twisted and tinned; twisted and untinned and having a terminal thereon; twisted and tinned and having a terminal thereon.

The mechanisms comprising the apparatus in accordance with the invention operate in timed sequence during repetitive cycles of operation. It is to be understood that coordination of all mechanisms in accordance with the invention is carried out in the sequence described by suitable drive mechanisms and control means for such drive mechanisms. Such drive mechanisms and control means are of conventional known construction, and, therefore, are not disclosed herein, except to the extent necessary to explain the present invention, in order to avoid undue complication in ahe description.

We claim

1. Apparatus for making a wire lead which comprises a wire cable segment including a plurality of insulated stranded conductors disposed within an insulating jacket and connected at one end to the prongs of a plug, comprising:

feed means for providing a cable segment;

main conveyor means for conveying said segment along a path;

first means adjacent said main conveyor means for receiving said segment and for stripping a portion of said insulating jacket from said insulated stranded conductors to expose one end of each of said insulated stranded conductors within said portion;

second means, including a wire bending and guiding device, adjacent said main conveyor means for receiving said segment from said first means for shaping and spacing the exposed ends of said insulated stranded conductors to accommodate the prongs of said plug;

third means adjacent said main conveyor means for receiving said segment from said second means for stripping a portion of the insulation from the shaped ends to expose the stranded conductors therewithin and means for twisting the exposed stranded conductors to strengthen them;

and fourth means adjacent said main conveyor means for receiving said segment from said third means for attaching the shaped and spaced exposed twisted ends of said conductors to the prongs of said plug.

2. Apparatus according to claim 1 further including fifth means adjacent said main conveyor means for stripping another portion of said insulating jacket from said insulated stranded conductors to expose the other end of each of said insulated stranded conductors within said other portion;

sixth means adjacent said main conveyor means for receiving said segment from said fifth means for shaping and spacing the exposed other ends of said insulated stranded conductors;

and seventh means adjacent said main conveyor means for receiving said segment from said sixth means for stripping a portion of the insulation from the shaped ends to expose the stranded conductors therewithin.

3. Apparatus according to claim 2 wherein said seventh means further includes means for twisting the exposed stranded conductors at said other ends.

4. Apparatus according to claim 2 further including eighth means adjacent said main conveyor means for receiving said segment from said seventh means for fluxing and tinning the exposed stranded conductors at said other ends.

5. Apparatus according to claim 2 further including ninth means adjacent said main conveyor means for receiving said segment from said seventh means for attaching terminals to the exposed stranded conductors at said other ends.

6. Apparatus for making a wire lead which comprises a wire cable segment including a pair of insulated stranded conductors disposed within an insulating jacket and connected at one end to the prongs of a plug, comprising:

main conveyor means;
first means adjacent said main conveyor means for receiving said segment and for stripping portions of said insulating jacket from both ends of said insulated stranded conductors to expose both ends of each of said insulated stranded conductors within said portion;
second means, including a wire bending and guiding device, adjacent said main conveyor means for receiving said segment from said first means for shaping and spacing the exposed ends of said insulated stranded conductors at both ends;
auxiliary conveyor means for moving said wire bending and guiding device;
third means adjacent said main conveyor means for receiving said segment from said second means for stripping a portion of the insulation from the shaped ends at one end of said conductors to expose the stranded conductors therewithin and for twisting the exposed stranded conductors to strengthen them;
fourth means adjacent said main conveyor means for receiving said segment from said third means for attaching the shaped and spaced exposed twisted ends at said one end of said conductors to the prongs of said plug;
and fifth means adjacent said main conveyor means for receiving said segment from said second means for stripping a portion of the insulation from the shaped other ends at the other end of said conductor to expose the stranded conductors therewithin.

7. Apparatus according to claim 6 wherein said fifth means further includes means for twisting the exposed stranded conductors at said other ends.

8. Apparatus according to claim 6 further including sixth means adjacent said main conveyor means for receiving said segment from said fifth means for fluxing and tinning the exposed stranded conductors at said other ends.

9. Apparatus according to claim 6 further including seventh means adjacent said main conveyor means for receiving said segment from said fifth means for attaching terminals to the exposed stranded conductors at said other ends.

10. Apparatus for production of a wire lead which comprises a wire cable segment including a pair of insulated stranded wires encased in an insulating jacket with a double-pronged plug at one end of the segment, said apparatus comprising:

feed means for providing a cable segment;
main conveyor means for conveying said segment along a path;
first means adjacent said main conveyor means for receiving said segment from said feed means and for stripping part of the insulating jacket from one end of said segment to expose the insulated wires;
second means including a wire bending and guiding device, adjacent said main conveyor means for receiving said segment from said first means for shaping and spacing the exposed insulated wires at said one end of said segment;
third means adjacent said main conveyor means for receiving said segment from said second means for stripping insulation from the ends of said shaped wires and for twisting the exposed stranded conductors of said stripped wires;
and fourth means adjacent said main conveyor means for receiving said segment from said third means for attaching the prongs of said plug to the twisted conductors at said one end of said segment;
said second means including:
an auxiliary conveyor adjacent said main conveyor means for moving said wire bending and guiding device, an inserter mechanism for directing each pair of insulated wires into releasable engagement with said device, an actuator mechanism for actuating the device to effect wire bending, and a wire release mechanism;
said device being operable to bend the pair of wires and to hold said wires as they are moved by said main conveyor means through said third means and through said fourth means, said wire release mechanism operating to disengage said wires from said device to permit a finished lead to be moved further along by said main conveyor means.

11. Apparatus according to claim 10 wherein said third means comprises:

means for cutting the insulation at a location inwardly from said one end of said wires to provide cut portions of insulation;
means for gripping said wires to prevent rotational and axial movement of said wires;
and means for gripping said cut portions of insulation and for simultaneously rotating and axially removing each said cut portions of insulation to effect twisting of the stranded conductors therewithin and stripping thereof.

12. Apparatus according to claim 11 further including means for stripping a portion of said insulating jacket from the other end of said conductors to expose the other ends of said insulated stranded conductors;

means for shaping and spacing the exposed other ends of said insulated stranded conductors;
and means for stripping a portion of the insulation from the shaped ends to expose the stranded conductors therewithin.

13. Apparatus according to claim 12 further including means for twisting the exposed stranded conductors at said other ends.

14. Apparatus according to claim 12 further including means for fluxing and tinning the exposed stranded conductors at said other ends.

15. Apparatus according to claim 12 further including means for attaching terminals to the exposed stranded conductors at said other ends.

16. A method for making a wire lead having a plurality of insulated stranded conductors disposed within an insulating jacket and connected at one end to the prongs of a plug, comprising the steps of:

stripping a portion of said insulating jacket from an end of said conductors to expose the ends of said insulated stranded conductors;

shaping and spacing the exposed ends of said insulated stranded conductors to accommodate the prongs of said plug;

stripping a portion of the insulation from the shaped ends to expose the stranded conductors therewithin and simultaneously twisting said portion so as to twist the exposed stranded conductors to strengthen them;

and attaching the shaped and spaced exposed twisted ends of said conductors to the prongs of said plug.

17. A method according to claim 16 further including the steps of stripping a portion of said insulating jacket from the other end of said conductors to expose the other ends of said insulated stranded conductors;

shaping and spacing the exposed other ends of said insulated stranded conductors;

and stripping a portion of the insulation from the shaped ends to expose the stranded conductors therewithin.

18. A method according to claim 17 further including the step of twisting the exposed stranded conductors at said other ends.

19. A method according to claim 17 further including the steps of fluxing and tinning the exposed stranded conductors at said other ends.

20. A method according to claim 17 further including the step of attaching terminals to the exposed stranded conductors at said other ends.

* * * * *